(12) United States Patent
Ferguson

(10) Patent No.: US 12,511,638 B2
(45) Date of Patent: Dec. 30, 2025

(54) ASSIGNMENT OF NEAR-FIELD COMMUNICATIONS APPLETS

(71) Applicant: Capital One Services, LLC, McLean, VA (US)

(72) Inventor: Dexter Ferguson, Catonsville, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/462,714

(22) Filed: Sep. 7, 2023

(65) Prior Publication Data
US 2025/0086611 A1    Mar. 13, 2025

(51) Int. Cl.
G06Q 20/34    (2012.01)
G06Q 20/32    (2012.01)

(52) U.S. Cl.
CPC ....... *G06Q 20/352* (2013.01); *G06Q 20/3278* (2013.01)

(58) Field of Classification Search
CPC .................. G06Q 20/352; G06Q 20/3278
USPC ........................................ 235/380
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Allyson N Trail
(74) *Attorney, Agent, or Firm* — KDW Firm PLLC

(57) ABSTRACT

A method, a system, and a computer program product for using contactless cards and mobile applications for selecting and using methods of payment for transactions. An identifier associated with a transaction is received. The transaction is configured to be executed using at least one computing device. One or more virtual identifiers are generated using the received identifier. At least one virtual identifier is selected and assigned to the transaction. Execution of the transaction is triggered by the computing device using the assigned virtual identifier.

19 Claims, 17 Drawing Sheets

(56) References Cited

U.S. PATENT DOCUMENTS

| | | |
|---|---|---|
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |

(56) References Cited

U.S. PATENT DOCUMENTS

| | | |
|---|---|---|
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |

(56) References Cited

U.S. PATENT DOCUMENTS

| | | |
|---|---|---|
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger et al. |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer et al. |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |

(56) References Cited

U.S. PATENT DOCUMENTS

| | | |
|---|---|---|
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0221092 A1 | 8/2013 | Kushevsky et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0201086 A1* | 7/2014 | Gadotti ............. G06Q 20/3274 705/72 |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein et al. |
| 2015/0088757 A1 | 3/2015 | Zhou et al. |
| 2015/0089586 A1 | 3/2015 | Ballesteros |
| 2015/0113271 A1 | 4/2015 | Jooste et al. |
| 2015/0134452 A1 | 5/2015 | Williams |
| 2015/0134513 A1 | 5/2015 | Olson et al. |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins et al. |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |

(56) References Cited

U.S. PATENT DOCUMENTS

| | | |
|---|---|---|
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2021/0004806 A1 | 1/2021 | Noe |
| 2021/0272098 A1 | 9/2021 | Delsuc et al. |
| 2021/0279734 A1* | 9/2021 | Khatwani ............... G06F 21/36 |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| EP | 3719730 A1 | 10/2020 |
| GB | 2457221 A | 8/2009 |
| GB | 2516861 A | 2/2015 |
| GB | 2551907 A | 1/2018 |
| KR | 101508320 B1 | 4/2015 |
| KR | 20150140132 A | 12/2015 |
| WO | 199910824 A1 | 3/1999 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |
| WO | 2020072476 A1 | 4/2020 |
| WO | 2020160065 A1 | 8/2020 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_us/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

(56) References Cited

OTHER PUBLICATIONS

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon. com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
Author Unknown, "Global expansion of card tapping mobile OTP for security and convenience is imminent," Jun. 28, 2022, website: https://www.swidch.com/blogs/card-tapping-motp-blog.
Smart Card Alliance, "Co-Branded Multi-Application Contactless Cards for Transit and Financial Payment," A Smart Card Alliance Transportation Council White Paper (40 pages), Mar. 2008.
Author Unknown, "EMVCo—Card Personalisation Specification," EMVCo, EMV-SWG-NK15r4, Aug. 2021, Version 2.0, pp. 114.
The International Search Report and Written Opinion mailed Dec. 4, 2024 for PCT/US2024/043984 (14 pages).
Saush, "Getting information from an EMV chip card with Java," Sep. 8, 2006, WordPress, pp. 1-13.

* cited by examiner

ASSIGNMENT OF NEAR-FIELD COMMUNICATIONS APPLETS

TECHNICAL FIELD

This disclosure relates generally to data processing and, in particular, to contactless cards, and more particularly, to use of contactless cards and mobile applications for selection and use of methods of payment for transactions.

BACKGROUND

Tap-to-pay transactions have become some of the most popular ways of paying for goods and services. Tap-to-pay is based on radio-frequency identification (RFID) technology that may be embedded into credit cards, smartphones, and other mobile devices. This technology allows users to make credit card transactions by bringing their cards and/or smartphones within a specific distance of (or tapping on) specific areas of point-of-sale terminals, which enables transfer of certain data for the purposes of making a payment. However, existing systems do not allow for displaying and selection of methods of payment for a transaction.

SUMMARY

In some implementations, the current subject matter relates to a computer-implemented method for using contactless cards and mobile applications for selection and use of methods of payment for transactions. The method may include receiving, using at least one processor, an identifier associated with a transaction. The transaction may be configured to be executed using at least one computing device communicatively coupled to at least one processor. The method may further include generating, using the received identifier, one or more virtual identifiers, selecting at least one virtual identifier in one or more virtual identifiers, assigning the selected at least one virtual identifier to the transaction, and triggering execution of the transaction by at least one computing device using the assigned at least one virtual identifier.

In some implementations, the current subject matter may include one or more of the following optional features. The receiving may include receiving the identifier from a contactless card communicatively coupled to at least one processor, the contactless card storing the identifier. The receiving may also include executing a near-field communication (NFC) exchange between the contactless card and at least one processor upon the contactless card being detected by at least one processor to be located within a predetermined distance of at least one processor.

In some implementations, executing the NFC exchange may include triggering at least one processor to generate at least one user interface, at least one user interface receiving an input triggering the selecting. The received identifier may include a contactless card number. The contactless card number may be associated with one or more financial accounts. The generated user interface may be configured to display each financial account in one or more financial accounts in response to the executing of the NFC exchange. The generated virtual identifiers may correspond to one or more financial accounts.

In some implementations, the contactless card may include at least one of the following: a credit card, a debit card, an electronic gift card, a pre-paid credit card, a pre-paid debit card, and any combination thereof.

In some implementations, the current subject matter relates to a system for using contactless cards and mobile applications for selection and use of methods of payment for transactions. The system may include a mobile device including at least one processor and at least one non-transitory storage media storing instructions, that when executed by at least one processor, may cause the processor to perform one or more of the following operations. The operations may include generating one or more virtual identifiers using one or more identifiers associated with a transaction. The transaction may be configured to be executed using at least one computing device communicatively coupled to the mobile device. One or more identifiers may be received from a contactless card communicatively coupled to the mobile device. The operations may further include triggering execution of the transaction by at least one computing device using at least one virtual identifier in one or more virtual identifiers.

In some implementations, the current subject matter may include one or more of the following optional features. At least one virtual identifier may be selected from one or more virtual identifiers and assigned to the transaction. The contactless card may be configured to store one or more identifiers. In some implementations, a near-field communication (NFC) exchange may be configured to be executed between the contactless card and the mobile device upon the contactless card being detected by the mobile device to be located within a predetermined distance of the mobile device. Execution of the NFC exchange may trigger the mobile device to generate at least one user interface. The user interface may be configured to receive an input triggering selection of at least one virtual identifier from one or more virtual identifiers. One or more identifiers may include a contactless card number. The contactless card number may be associated with one or more financial accounts. At least one user interface may be configured to display each financial account in one or more financial accounts in response to execution of the NFC exchange. One or more virtual identifiers may correspond to one or more financial accounts. The contactless card may include at least one of the following: a credit card, a debit card, an electronic gift card, a pre-paid credit card, a pre-paid debit card, and any combination thereof.

In some implementations, the current subject matter relates to a computer program product including a non-transitory machine-readable medium storing instructions that, when executed by at least one programmable processor, cause at least one programmable processor to perform one or more of the following operations. The operations may include executing a near-field communication (NFC) exchange between a contactless card and a mobile device upon the contactless card being detected by the mobile device to be located within a predetermined distance of the mobile device, receiving, in response to the executing of the NFC exchange, from the contactless card, one or more identifiers associated with a transaction, where the transaction may be configured to be executed using at least one computing device communicatively coupled to the mobile device, generating one or more virtual identifiers using one or more identifiers associated with the transaction, where one or more virtual identifier being associated with one or more financial accounts, and displaying one or more financial accounts on a user interface of the mobile device, selecting at least one virtual identifier in one or more virtual identifiers, and assigning the selected at least one virtual identifier to the transaction, and triggering execution of the transaction by at least one computing device using the assigned at least one virtual identifier.

In some implementations, the current subject matter include one or more of the following optional features. One or more identifiers include a contactless card number. The contactless card may include at least one of the following: a credit card, a debit card, an electronic gift card, a pre-paid credit card, a pre-paid debit card, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
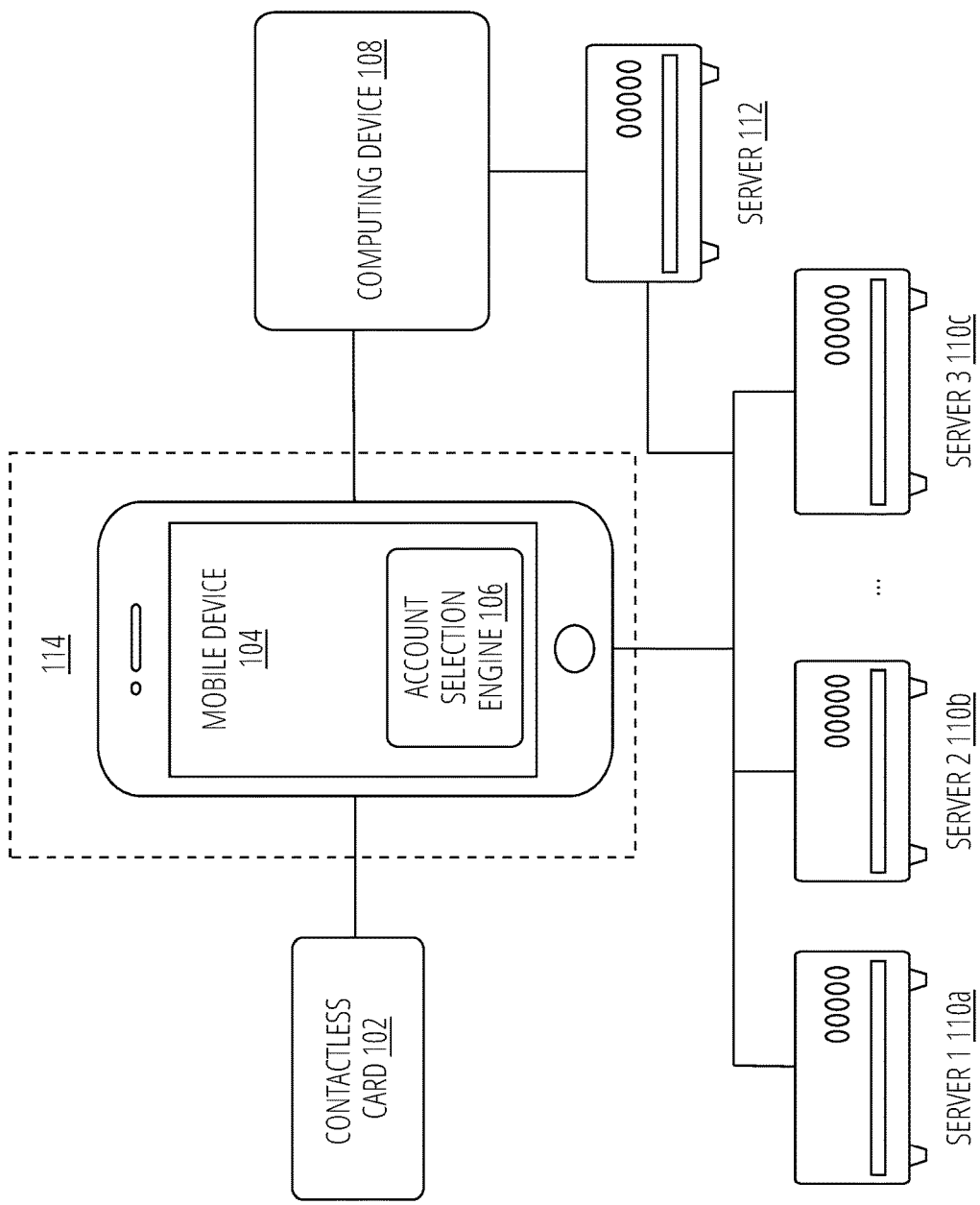
FIG. 1 illustrates an example system for execution of a transaction, according to some implementations of the current subject matter.

To address these and potentially other deficiencies of currently available solutions, one or more implementations of the current subject matter relate to methods, systems, articles of manufacture, and the like that can, among other possible advantages, provide an ability to execute transactions through selection of specific financial accounts.

In some implementations, the current subject matter generally relates to an ability to use a contactless card and a mobile device to select a specific financial account to execute (e.g., pay for) a transaction (e.g., at a point-of-sale terminal). For example, a user of the contactless card and/or the mobile device may have and use a variety of financial accounts at different (or same) financial institutions (e.g., credit card companies, banks, etc.). The contactless card may be a credit card, a debit card, an electronic gift card, a pre-paid credit card, a pre-paid debit card, and/or any other card, and/or any combination thereof. The user may use user's financial accounts for transaction payments (e.g., purchasing, bill payments, etc.), transfer of funds, and/or any other executions of financial transactions, and/or for any other purpose. When executing financial transactions (e.g., a purchase at point-of-sale terminal at retailer 1), the user may select a particular account (e.g., credit card no. 1) from user's financial accounts for such transaction. Similarly, when executing another financial transaction (e.g., a payment of a bill at a utility company 1), the user may select another account (e.g., checking account) from user's financial accounts for completion of that transaction.

To perform selection of an account, the user of the contactless card and the mobile device (e.g., mobile telephone, smartphone, smart tablet, etc.) may tap the card on the mobile device. Such tapping may prompt the mobile device to obtain information from the contactless card. In some implementations, the current subject matter may be configured to execute a near field communication (NFC) exchange between the contactless card and the mobile device, upon the mobile device detecting that the contactless card is located within a predetermined distance, area, boundary, etc. from the mobile device. The mobile device may be configured to act as an "active" component and provide power to energize the contactless card, which may be considered as a "passive" component. The NFC exchange may be configured to trigger opening of a user interface containing the applet on the mobile device and/or displaying one or more user's financial accounts for use in executing the transaction.

In some implementations, upon detecting the contactless card within a predetermined distance, area, boundary, etc. of the mobile device, the mobile device may request and/or be automatically provided with various identification data from the contactless card. The card's identification data may include various information identifying the card and/or the user of the card. It may include one or more identifiers that may be used to identify the card. The contactless card may also transmit various contactless card data. The contactless card data may include the contactless card data includes at least one of the following: an account number associated with the contactless card, an expiration date associated with the contactless card, a card verification value (CVV) associated with the contactless card, a billing address associated with the contactless card, a name of a user associated with the contactless card, and any combination thereof. In some implementations, the mobile device may be configured to store the received contactless card data and/or transmit it to one or more servers (e.g., servers that may be communicatively coupled to the mobile device and associated with the financial institution that issued the card.

The mobile device may then use the contactless card information to generate a user interface (e.g., an applet) that may display user's various financial accounts. For example, the mobile device may use the contactless card information to retrieve user's financial accounts information from various financial institutions and then display them in the generated user interface. The mobile device may also indicate which of the displayed accounts (some and/or all) may be used for transaction execution. For example, the mobile device may display available balances for each account, which may assist the user with making a selection of a specific financial account for transaction execution.

Once the accounts are presented in the generated user interface, the mobile device may generate and assign one or more virtual account numbers/identifiers to each displayed financial account. The user may then select (e.g., by tapping on a specific financial account with user's finger, palm, etc.) a particular financial account on the user interface that the user desires to use in connection with execution of the transaction. The virtual account number associated with the selected financial account may be transmitted to a computing device (e.g., point-of-sale terminal) executing the transaction (e.g., payment for a purchase).

In some implementations, the contactless card may be automatically detected by the mobile device upon coming within a predetermined area, distance, and/or boundary around the mobile device. Such area/distance/boundary may be determined by the NFC protocols. Once the contactless card has been detected by the mobile device, the mobile device may generate the above applet and display financial accounts.

FIG. 1 illustrates an example system 100 for execution of a transaction, according to some implementations of the current subject matter. The system 100 may include a contactless card 102, a mobile device 104 having a near-field communications boundary 114, a computing device 108 that may execute a transaction, one or more servers 110 (a, b . . . c) associated with financial institutions holding user's financial accounts, and one or more servers 112 associated with the computing device 108.

One or more components of the system 100 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 100 may include any combination of hardware and/or software. In some implementations, one or more components of the system 100 may be disposed on one or more computing devices, such as, server(s), database(s), personal computer (s), laptop(s), cellular telephone(s), smartphone(s), tablet computer(s), virtual reality devices, and/or any other computing devices and/or any combination thereof. In some example implementations, one or more components of the system 100 may be disposed on a single computing device and/or may be part of a single communications network. Alternatively, or in addition to, such services may be separately located from one another. A service may be a computing processor, a memory, a software functionality, a routine, a procedure, a call, and/or any combination thereof that may be configured to execute a particular function associated with the current subject matter lifecycle orchestration service(s).

In some implementations, the system 100's one or more components may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system 100 also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 100 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. One or more components of the environment 100 may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example implementations, one or more components of the environment 100 may execute one or more applications, such as software applications, that enable, for example, network communications with one or more components of environment 100 and transmit and/or receive data.

One or more components of the environment 100 may include and/or be in communication with one or more servers via one or more networks and may operate as a respective front-end to back-end pair with one or more servers. One or more components of the environment 100 may transmit, for example from a mobile device application (e.g., executing on one or more user devices, components, etc.), one or more requests to one or more servers (e.g., server(s) 106). The requests may be associated with retrieving data from servers. The servers may receive the requests from the components of the system 100. Based on the requests, servers may be configured to retrieve the requested data from one or more databases (e.g., database 110, as shown in FIG. 1). Based on receipt of the requested data from the databases, the servers may be configured to transmit the received data to one or more components of the system 100, where the received data may be responsive to one or more requests.

The system 100 may include one or more networks, such as, for example, networks that may be communicatively coupling the mobile device 104, the computing device 108 and/or one or more servers 110 and/or 112. In some implementations, networks may be one or more of a wireless network, a wired network or any combination of wireless network and wired network and may be configured to connect the components of the system 100 and/or the components of the system 100 to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 100 may include one or more servers, which may include one or more processors that maybe coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system 100.

One or more components of the system 100 may be configured to execute one or more transactions using one or more containers. In some implementations, each transaction may be executed using its own container. A container may refer to a standard unit of software that may be configured to include the code that may be needed to execute the action along with all its dependencies. This may allow execution of actions to run quickly and reliably.

In some implementations, as discussed above, the system 100 may be used for execution of a transaction using a financial account that may be selected from an applet generated by the mobile device 104. In particular, the account selection process and subsequent execution of the transaction may be initiated using near-field communications (NFC) exchange link between the contactless card 102 and the mobile device 104. To enable use of the NFC technology, a user (not shown in FIG. 1) may bring the contactless card 102 within the area 114 of the mobile device 104 (e.g., tap the card 102 on the mobile device 104 or hold the card 102 near the mobile device 104 without tapping), whereby the mobile device 104 may be configured to detect presence of the contactless card 102 within the area 114 and execute one or more operations discussed herein.

In the NFC exchange link, the mobile device 104 may be configured to act as an active component and provide power to energize the contactless card 102 (as discussed herein), which may be a passive component. Using the NFC exchange link, the mobile device 104 and the contactless card 102 may be configured to exchange various data, such as, for instance, for the purposes of identification of financial accounts and selections thereof for the purposes of transaction execution.

In some implementations, as discussed herein, the mobile device 104 may be securely linked to user's financial accounts at various financial institutions. Each financial institution may include one or more servers 110 (a, b, ... c), as shown in FIG. 1, with which the mobile device 104 may communicate to exchange various data associated with one or more of user's financial accounts. The contactless card 102 may likewise be securely linked to one of user's financial accounts. The linking of the mobile device 104 and the financial accounts may be configured to allow the mobile device 104 to display in an applet available financial accounts for user's selection to use in transaction execution. Access to the financial accounts from the mobile device 104 may be secured/protected using various authentication/authorization mechanisms (e.g., a facial recognition data, a fingerprint data, a biometric data, a username and a password, a multi-factor authentication token, and any combination thereof, etc.).

Once the mobile device 104 detected the contactless card 102 within the area 114, the mobile device 104, using the NFC exchange link, may be configured to request and/or be automatically provided with various identification data from the contactless card 102. The identification data may include various information identifying the card and/or the user of the card (e.g., one or more identifiers, etc.).

In some implementations, to access a specific financial account (e.g., upon user selecting such account), the user may also be prompted to provide user authentication information. Such information may include, but is not limited to, one or more authentication keys, and/or data and/or information, such as, for example, a facial recognition data, a fingerprint data, a biometric data, a username and a password, a multi-factor authentication token, and any combination thereof. The mobile device 104 may be configured to generate an appropriate prompt requesting the user to provide authentication information. Once the information is provided, the mobile device 104 may transmit this information to one or more servers 110 (a, b, . . . c) for verification. Once verified, the servers 110 (a, b, . . . c) may transmit an indication that verification was successful and the account may be available for use in the transaction. Otherwise, the servers may transmit an indication the verification was not successful and access to the account may be blocked at this time, thereby preventing use of the account in the transaction.

To execute a transaction with the computing device 108 (e.g., a purchasing transaction at a point-of-sale terminal), the mobile device 104 may be configured to communicate with the computing device 108 and receive details of the transaction. The details may include transaction identification information, computing device 108 identification information, amount(s) involved, terms of the transaction, and/or any other information that may be needed to execute such transaction. The computing device 108 may transmit this information to the mobile device 104 upon receiving an appropriate request from the mobile device 104. The computing device 108 and the mobile device 104 may be located proximate to one another and/or at any desired distance away (e.g., the mobile device 104 may be used to execute a transaction with the computing device 108 over the internet).

Figure 4:
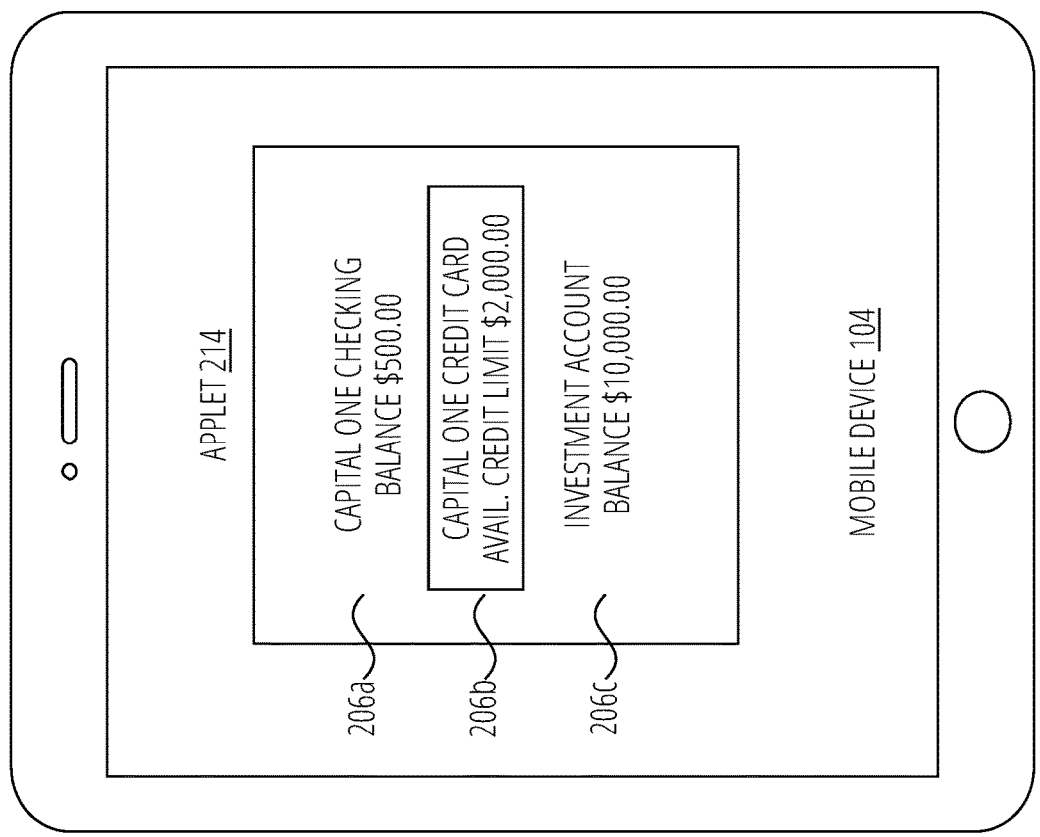
FIG. 4 illustrates an example of a graphical applet or graphical user interface that may be displayed on the mobile device shown in FIG. 1, according to some implementations of the current subject matter.

Upon receiving the transaction details from the computing device 108, the mobile device 104, using its account selection engine 106, may generate a prompt to the user to tap the contactless card 102 so that selection of one or more financial accounts for execution of the transaction may take place. Alternatively, the financial accounts may already be displayed in a graphical applet and/or any other graphical user interface (e.g., as shown in FIG. 4) of the mobile device 104 prior to receiving transaction details from the computing device 108. The applet may be generated by the account selection engine 106.

In some implementations, bringing the contactless card 102 within the area 114 of the mobile device 104 may cause the account selection engine 106 to automatically generate such graphical applet and/or any other graphical user interface populated with available user's financial accounts, as for example, is shown in FIG. 4. The mobile device 104, using the engine 106, may request the identification information from the contactless card 102 and, upon receiving it, may send it to one or more servers 110 (a, b, . . . , c). In response, one or more of the servers 110 may respond with information relating to available user's financial account (e.g., name of the account, account number, balance information, credit limit, authorization requirements, etc.). The engine 106 of the mobile device 104 may then process the received financial accounts information and display it in the generated applet. The mobile device 104 may also prompt the user to select one or more of the accounts for execution of the transaction with the computing device 108. In some example implementations, the mobile device 104, upon receiving user's selection of a particular financial account, may request the user to provide authentication information (e.g., a passcode, a fingerprint and/or any other biometric identification information, etc.) in order to verify user's right to use the accounts.

Once financial account(s) are selected, and, optionally, their use has been authenticated, the engine 106 of the mobile device 104 may request the user to confirm that the user wishes to execute the transaction. Upon receiving confirmation, the engine 106 of the mobile device 104 may generate a virtual account number and/or identifier (hereinafter, "virtual account number") representative of the selected financial account. The virtual account number may be any random sequence of alpha-numeric characters and may be generated in any desired way. The virtual account number may be configured to hide the actual account information (e.g., account number, name of the user, etc.) associated with the selected financial account.

The engine 106 of the mobile device 104 may then transmit the generated virtual account number to the computing device 108 for processing of the transaction. The computing device 108 may transmit the received virtual account number to the server 112. The server 112 may be associated with a financial institution that may be servicing one or more financial accounts that may be linked to the computing device 108 (e.g., in a retail purchase transaction, the computing device 108 may represent retailer's point of sale terminal and the server 112 may be associated with banking or financial institution holding one or more financial accounts used by the retailer). The server 112 may be communicatively coupled with one or more servers 110 (a, b, . . . c) and may transmit the received virtual account number to one or some or all of the servers 110 (a, b, . . . c) and request verification. In the request, the server 112 may also transmit information about the transaction, such as, for example, transaction description, transaction amount(s), mobile device 104 information, etc.

In some implementations, the server 112 may use the received virtual account number to determine which sever 110 (a, b, . . . c) should be receiving its request. In this case, the virtual account number may be configured to include an identifier of the financial institution corresponding to the selected financial account. Using this identifier, the server 112 may only transmit its request to the specific financial institution identified in the virtual account number.

Alternatively, or in addition, upon receiving a selection of specific financial account(s), the engine 106 of the mobile device 104 may transmit a request to the specific server(s) 110 (a, b, . . . c) that is associated with the financial institution(s) holding the selected financial account(s). The request may include a request to authorize the transaction with the computing device 108. The request may also include a virtual account number corresponding to the selected financial account. Once the request to authorize transaction is received by the specific server(s) 110 (a, b, . . . c), the server(s) may transmit an appropriate authorization to the server 112, which may then pass it along to the computing device 108 for completion of the transaction. Alternatively, or in addition, upon receiving the request to authorize transaction, the specific server 110 (a, b, . . . c) may generate a virtual account number and transmit it to the server 112, and thus, to the computing device 108.

In some implementations, the virtual account number (regardless of whether it is generated by the engine 106 of the mobile device 104 and/or the servers 110 (a, b, . . . c)) may only be used in connection with the specific transaction with the specific computing device 108. Its use with any other transaction and/or any other computing device may be prohibited. The virtual account number may also be assigned a predetermined period of time within which it must be used. In this case, if the transaction is not completed within the predetermined period of time, use of such virtual account number may be prevented. This may provide further security to the use of user's financial accounts in connection with transactions. Alternatively, or in addition, virtual account numbers may be reusable and may be used in connection with any other transactions and/or any other computing devices and/or not be limited by a predetermined time of use.

Upon receiving of the virtual account number, the computing device 108 may complete execution of the transaction. For example, in the retail scenario, completion of execution of the transaction, may involve completion of the purchase transaction. In some implementations, the computing device 108 may transmit a request to the mobile device 104 to confirm use of the virtual account in connection with the transaction. The engine 106 of the mobile device 104 may respond to the computing device 108 with confirmation, after which transaction may be completed. Alternatively, the engine 106 of the mobile device 104 may respond with denial causing transaction to be aborted.

Figure 2:
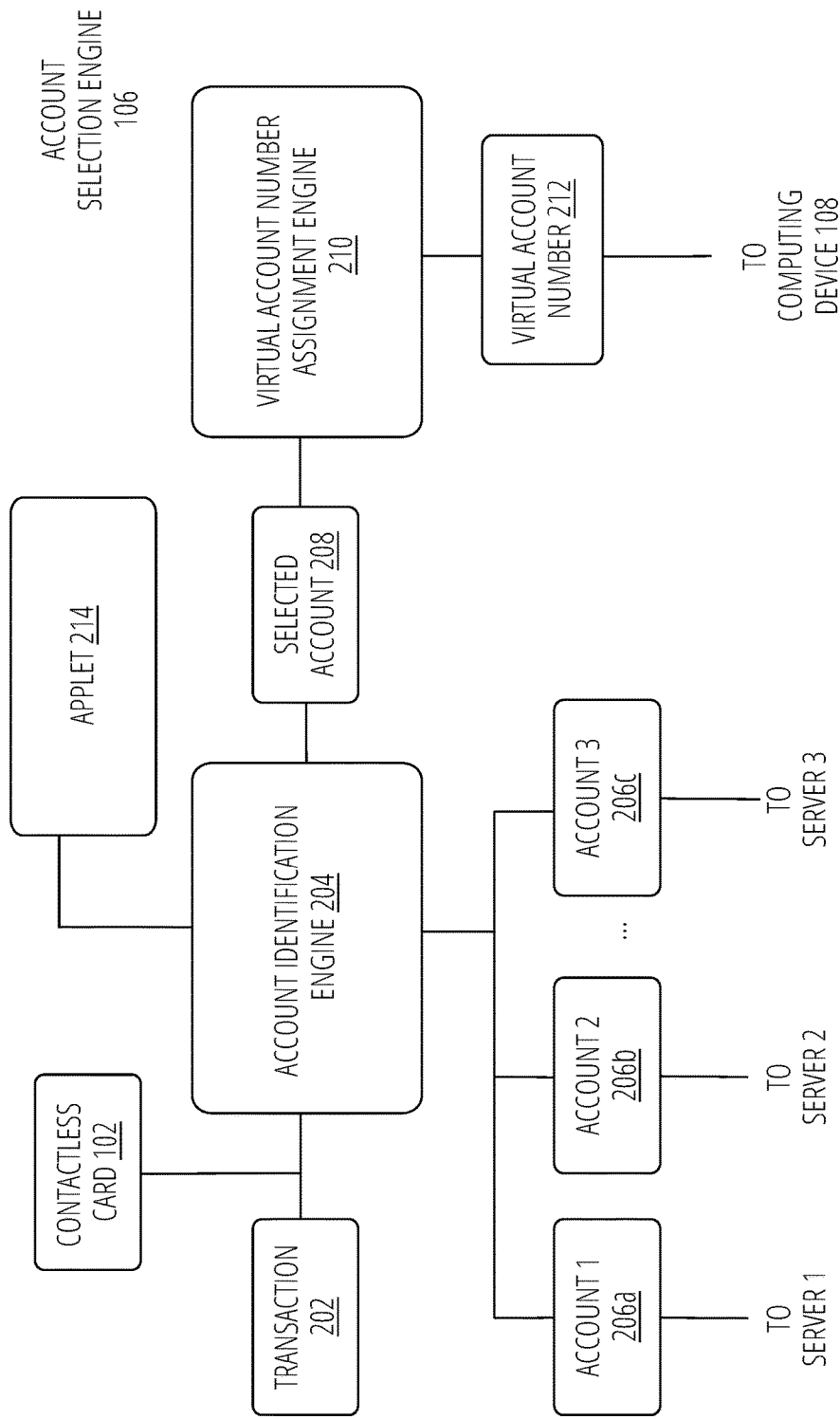
FIG. 2 illustrates an example operation of an account selection engine of the mobile device shown in FIG. 1, according to some implementations of the current subject matter.

FIG. 2 illustrates an example operation of the account selection engine 106 of the mobile device 104, according to some implementations of the current subject matter. The engine 106 may include an account identification engine 204 that may be configured to receive details of the transaction 202 and/or information from the contactless card 102. The account identification engine 204 may transmit the received transaction details and/or contactless card information to servers 1, . . . , 3 110 (a, b, . . . c).

The servers 110 may respond to the engine 204 with information relating to available user's financial accounts, e.g., account 1 206a, account 2 206b, . . . , account 3 206c. The engine 204 may then process the received financial accounts information and display information related to accounts 206 in a graphical applet or any other graphical user interface 214 of the mobile device 204. For example, account 206a may be a checking account at Capital One Bank, account 206b may be a credit card, and account 206c may be an investment account. Each account may, for example, be identified by the logo associated with the financial institution holding the account, and its listing in the applet may include account number (or partial account number), available balance details, credit line (if any), and/or any other information.

The engine 204 may then prompt the user to select one of the account 206. This may be accomplished using any desired way (e.g., tapping a finger on the screen of the mobile device, clicking, sliding, etc.). The selected account information 208 may then be transmitted to the virtual account number assignment engine 210. The engine 210 may generate a virtual account number for the selected account. As stated above, the virtual account number may be any combination of alpha-numeric and/or any other characters that may be designed to conceal the actual account number information. The virtual account number may also include one or more identifiers identifying the financial institution associated with the selected account information 208.

The engine 210 may then transmit the virtual account number information 212 to the computing device 108 for processing of the transaction. Alternatively, or in addition, the engine 210 may also transmit this information to one or more of the servers 110 (as shown in FIG. 1) for verification and/or transmission to the computing device 108, via server 112.

Figure 3:
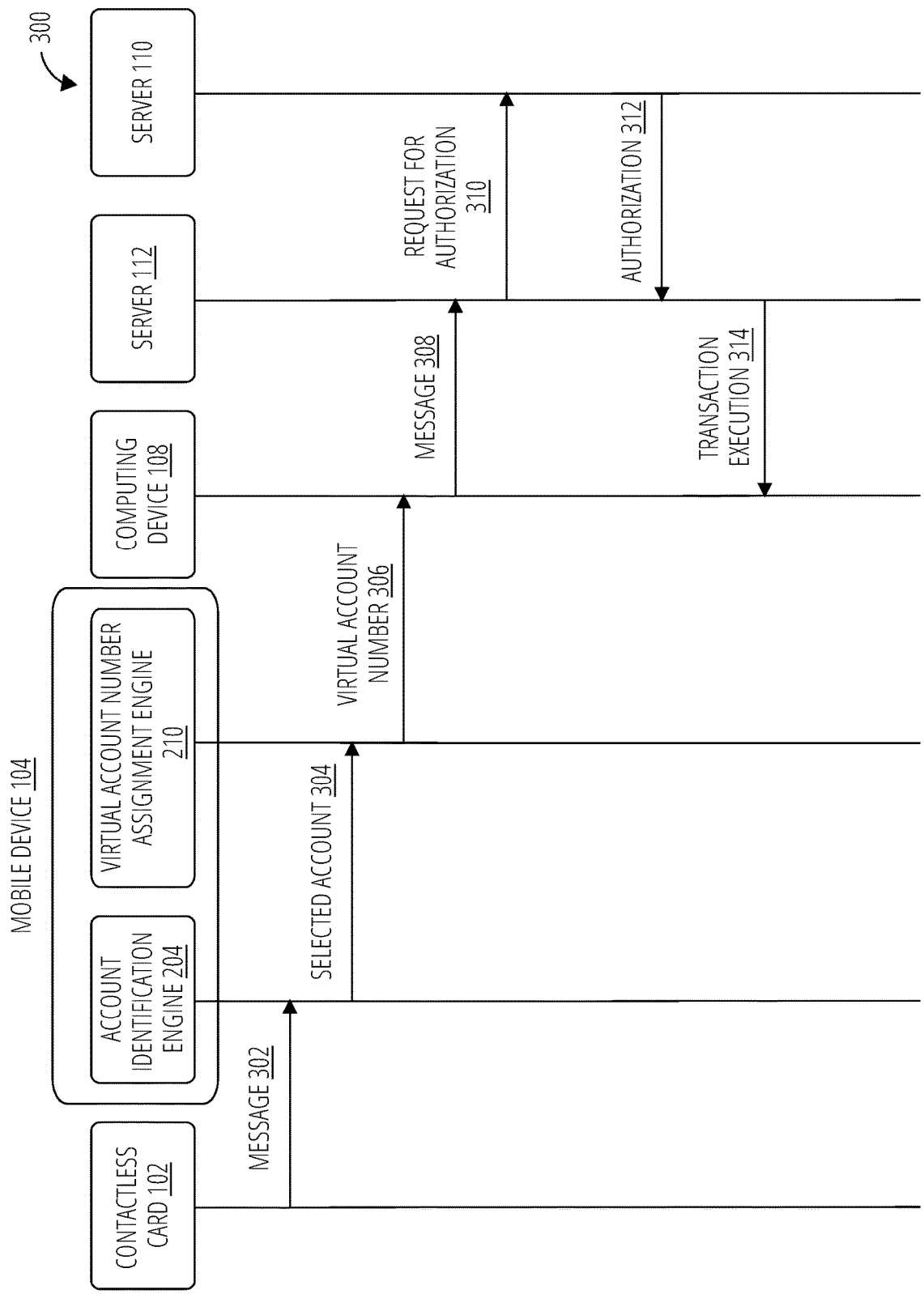
FIG. 3 illustrates a sequence diagram representing an example process for executing a transaction, according to some implementations of the current subject matter.

FIG. 3 illustrates a sequence diagram representing an example process for executing a transaction, according to some implementations of the current subject matter. The process shown in FIG. 3 may be executed using the system 100 shown in FIGS. 1 and 2.

The contactless card 102 may be configured to transmit a message 302 to the mobile device 104, which may include the account identification engine 204 and the virtual account number assignment engine 210. The contactless card 102 may transmit such message using a near-field communication exchange link that may be established between the mobile device 104 and the contactless card 102 upon contactless card 102 being detected by the mobile device 104 to be within the predetermined area 114 of the mobile device 104.

The message 302 may include various contactless card 102 information, including but not limited to, an account number associated with the contactless card, an expiration date associated with the contactless card, a card verification value (CVV) associated with the contactless card, a billing address associated with the contactless card, a name of a user associated with the contactless card, and any combination thereof. The message 302 may be transmitted to the mobile device 104 either prior to initiation of a transaction with the computing device 108 and/or after commencement of the transaction.

The account identification engine 204 of the mobile device 104 may receive the message 302. This may trigger the engine 204 to identify one or more financial accounts that the user of the mobile device 104 and/or contactless card 102 may have with one or more financial institutions. As discussed above in connection with FIG. 2, the engine 204 may contact one or more servers 110 to retrieve information about such accounts and display them in a graphical applet or graphical user interface (such as, for example, as shown in FIG. 4). The accounts may include, a checking account, a saving account, a credit card account, an investment account, and/or any other type of account from which funds may be withdrawn for the purposes of execution of the transaction by the computing device 108.

The account identification engine 204 may, optionally, also prompt the user to select one or more of the displayed identified financial accounts. Selection may be made through tapping, clicking, sliding, etc. on the screen of the mobile device 104 in the area of the graphical user interface of the mobile device 104 corresponding to where the desired financial account is displayed.

The selected account information 304 may then be sent by the engine 204 to the virtual account number assignment engine 210 to generate a virtual account number 306. As stated above, the virtual account number may be any random sequence of alpha-numeric and/or any other characters that conceals the actual account information of the selected account 304. In some implementations, the engine 210 may generate virtual account numbers for all financial accounts that may have been retrieved by the account identification engine 204.

The virtual account number 306 may then be sent to the computing device 108 for use in connection with execution of the transaction. In some implementations, prior to transmission of the virtual account number 306, the mobile device 104 may be configured to request user's authorization to do so. For example, the mobile device 104 may request the user to provide authentication information, such as, a passcode, a fingerprint, a faceprint, and/or any other biometric information, and/or any other type of authentication information. Once the user provides the authentication information, the mobile device 104 may determine that the user authorized it to transmit the virtual account number 306 to the computing device 108. The virtual account number 306 may be one-time use only (e.g., to be used with the specific transaction only) and/or may be valid for a predetermined period of time (e.g., upon expiration of which, it may no longer be used).

Upon receipt of the virtual account number 306, the computing device 108 may transmit message 308 to the server 112, which may be associated with the computing device 108. The message 308 may include the virtual account information 306 along with information associated with the transaction. The server 112 may transmit a request for authorization 310 to the server 110, which may be associated with the selected financial account 304. Alternatively, or in addition, the computing device 108 may transmit request for authorization 310 to the server 110 directly. The request 310 may seek server 110's authorization to use the financial account corresponding to the virtual account number 306 to proceed with execution of the transaction.

Assuming the request contains valid information (e.g., valid virtual account number 306, transaction information, authentication of the computing device 108, and/or any other information), the server 110 may transmit an authorization 312 to the server 112 and/or directly to the computing device 108. As can be understood, the servers 110, 112 and/or the computing device 108 may perform one or more exchanges prior to transmission of authorization 312. Once authorization 312 is received, the computing device 108 may be configured to proceed with execution 314 of the transaction.

The above process is advantageous in that it allows selection of specific financial accounts for execution of transactions. It also ensures and preserves security of any sensitive information that may be exchanged between various computing devices through use of virtual account numbers as well as various verification/authentication mechanisms.

FIG. 4 illustrates an example of a graphical applet or graphical user interface 214 that may be displayed on the mobile device 104. The applet/interface 214 may be generated by the mobile device 104, and in some implementations, its account identification engine 204 (as shown in FIG. 2). The applet/interface 214 may be generated as a result of the engine 204 receiving information from one or more servers 110 (not shown in FIG. 4) associated with one or more financial accounts that the user may have at various financial institutions. For example, the applet/interface 214 may show the following accounts: "Capital One Checking", "Capital One Credit Card", and "Investment Account". The applet/interface 214 may also display available balances for each account (e.g., "$500.00" for the checking account; "$2,000.00" for the credit card account; and "$10,000.00 for the investment account). As can be understood, any other information may be displayed in the applet/interface 214. The displayed information is generated based on the information received from one or more servers 110.

As shown in FIG. 4, one of the accounts, account 206b, displayed in the applet/interface 214 has been selected as the account that the user wishes to use in connection with the transaction. The selection may be made by tapping, clicking, sliding, etc. on the screen of the mobile device 104. Once selected, the account may be highlighted to distinguish it from other accounts. As can be understood, more than one account may be selected. The selected account(s) may be transmitted to the virtual account umber assignment engine 210 (not shown in FIG. 4) for generation of a corresponding virtual account number 306 (as shown in FIG. 3).

Figure 5:
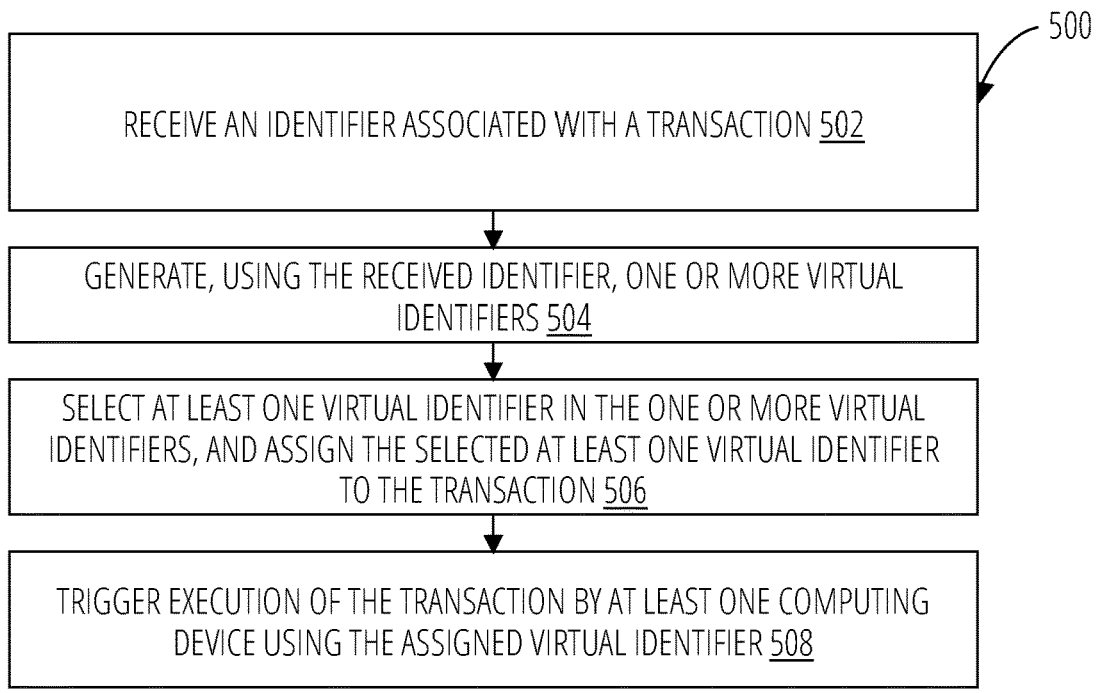
FIG. 5 illustrates an example process for execution of a transaction, according to some implementations of the current subject matter.

FIG. 5 illustrates an example process 500 for execution of a transaction, according to some implementations of the current subject matter. The process 500 may be executed using one or more components of the system 100 shown in FIG. 1. In particular, account selection engine 106 running on the mobile device 104 may be used for these purposes.

At 502, the account selection engine 106 may be configured to receive an identifier associated with a transaction to be executed by the computing device 108 communicatively coupled to the mobile device 104. Any other transaction information may be received. In some implementations, the contactless card 102 may also provide various information to the mobile device 104, which, as discussed above, may be used to retrieve information about one or more financial accounts that may be used in connection with the transaction execution. Alternatively, or in addition, the contactless card 102 may also provide one or more identifiers (e.g., an account number associated with the contactless card, an expiration date associated with the contactless card, a card verification value (CVV) associated with the contactless card, a billing address associated with the contactless card, a name of a user associated with the contactless card, and any combination thereof), which may be stored in the memory of the contactless card 102.

In some implementations, a near-field communication (NFC) exchange may be executed between the contactless card 102 and the mobile device 104 upon the contactless card 102 being detected by the mobile device 104 to be located within a predetermined area/distance 114, as shown FIG. 1. Further, once the NFC exchange between the contactless card 102 and the mobile device 104 is established, the mobile device 104 may be configured to generate one or more graphical applets and/or graphical user interfaces (e.g., user interface 214, as shown in FIG. 4). The generated applet may be configured to list the financial accounts and receive input that may trigger selections of the accounts and subsequent generation of virtual identifiers/account numbers for the selected account.

In some implementations, the contactless card 102 (including all of its information) may be linked to and/or associated with one or more user's financial accounts, which may be displayed in the generated applet, as discussed above. Moreover, virtual identifiers/account numbers may be generated for only the financial account that has been selected in the applet, or for some and/or all financial accounts being displayed in the applet.

Further, the contactless card 102 may be any type of card. For example, the contactless card 102 may be a credit card, a debit card, an electronic gift card, a pre-paid credit card, a pre-paid debit card, and any combination thereof.

Referring back to FIG. 5, the account selection engine 106 of the mobile device 104 may, at 504, generate one or more virtual identifiers or virtual account numbers based on the received information (e.g., information about the transaction, information about the financial accounts, etc.). For example, as shown in FIG. 3, the virtual account number assignment engine 210 may generate such virtual identifier or virtual account number 306. The virtual identifier may then be used in connection transaction execution. As can be understood, such virtual identifiers/account numbers may be generated for more than one financial account.

At 506, the virtual identifier may be selected and assigned for use with the transaction. For example, selection/assignment may be triggered as a result of a selection of an account from a listing of accounts made on the screen of the mobile device 104 (as shown in FIG. 4). Once selection is made, the engine 106 may trigger execution of the transaction by the computing device 108 using the assigned at least one virtual identifier, at 508.

Figure 6:
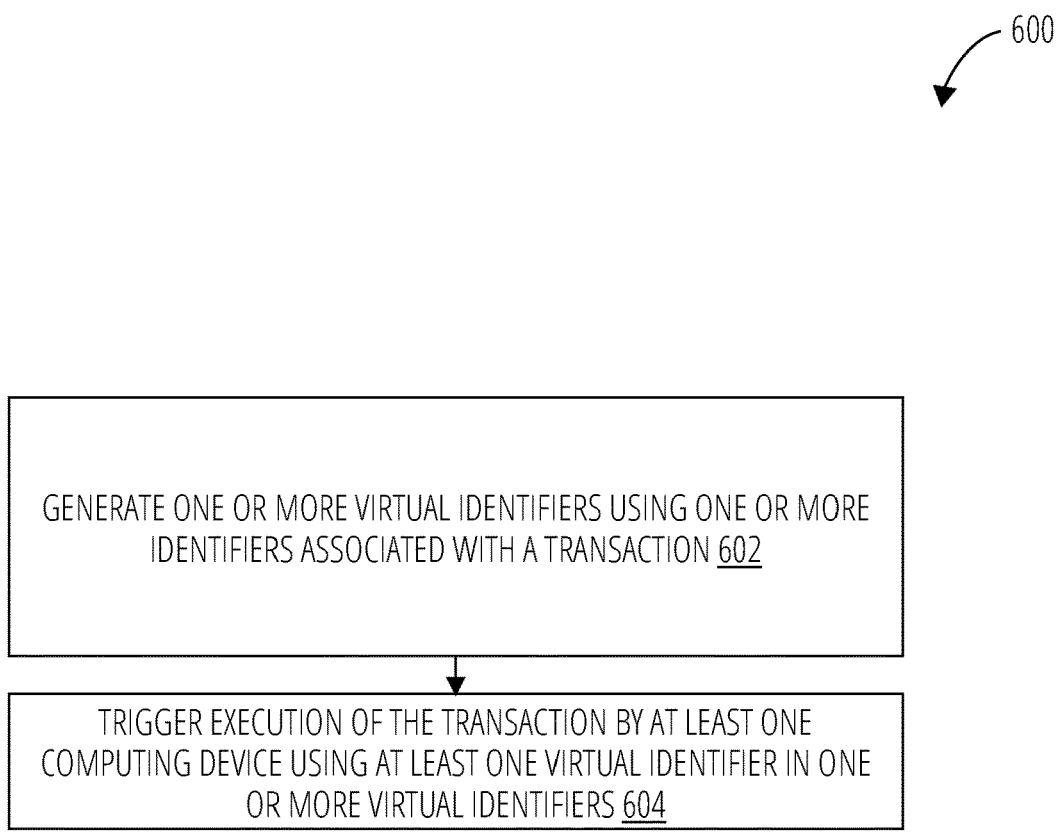
FIG. 6 illustrates another example process for execution of a transaction, according to some implementations of the current subject matter.
Figure 7:
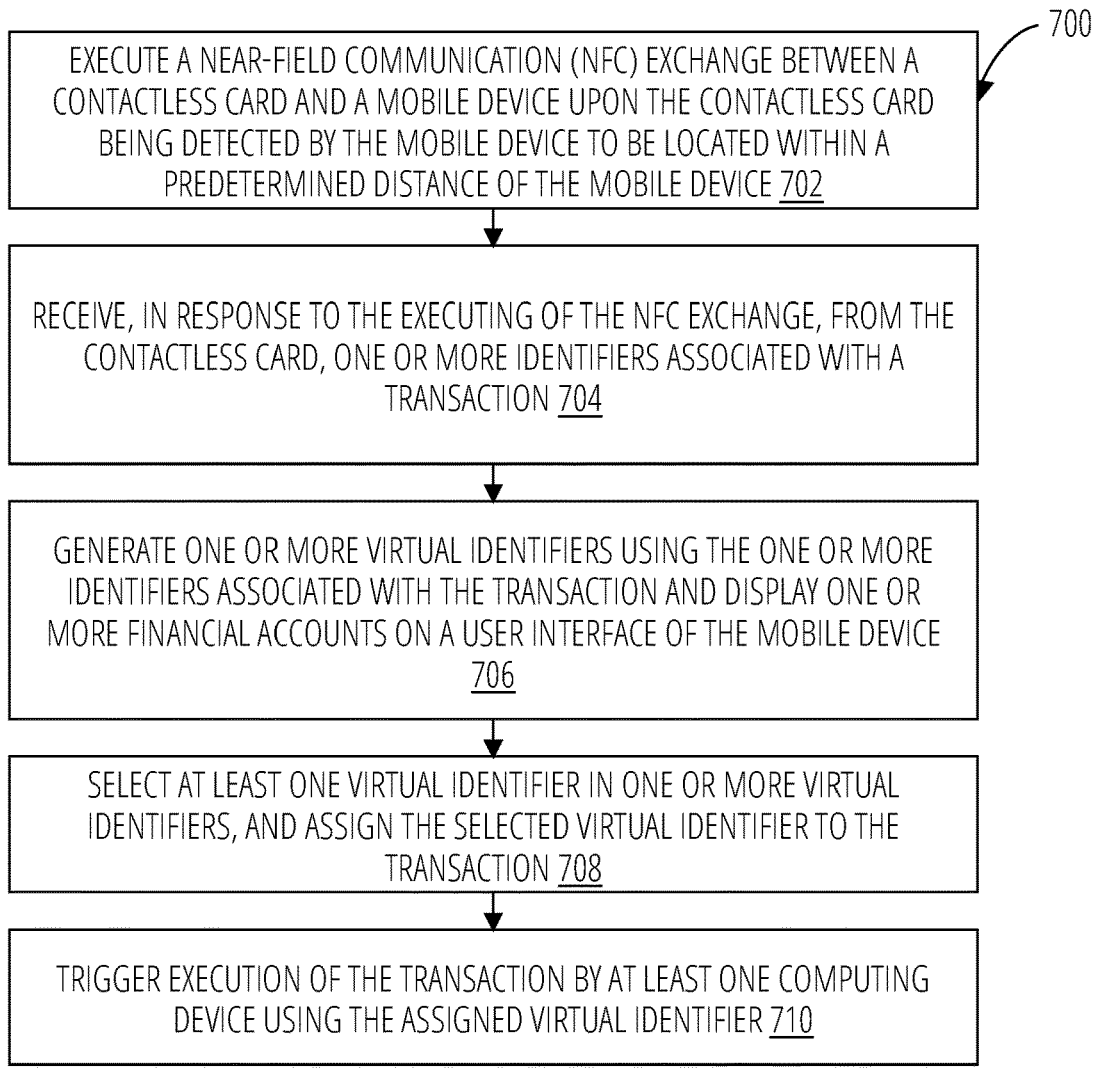
FIG. 7 illustrates yet another example process for execution of a transaction, according to some implementations of the current subject matter.

FIG. 6 illustrates another example process 600 for execution of a transaction, according to some implementations of the current subject matter. The process 600 may likewise be executed using one or more components of the system 100 shown in FIG. 1.

At 602, the mobile device 104 may be configured to generate one or more virtual identifiers using one or more identifiers associated with a transaction (e.g., transaction 202, as shown in FIG. 2). The transaction may be executed using at least one computing device (e.g., computing device 108, as shown in FIG. 1) communicatively coupled to the mobile device. The identifiers may be received from a contactless card (e.g., contactless card 102 as shown in FIG. 1) communicatively coupled to the mobile device. More than one virtual identifier may be generated and one such virtual identifier may be selected for further processing of the transaction. As stated above the contactless card and the mobile device may be communicatively coupled using NFC exchange communication link. Activation of such NFC exchange link may trigger generation of one or more graphical applets and/or graphical user interfaces to be displayed by the mobile device. The applets may display information about one or more financial accounts associated with the user, which the user may use to select for triggering execution of the transaction by the computing device, at 604. Selection of a financial account causes transmission of a virtual identifier to the computing device for execution of the transaction.

FIG. 6 illustrates yet another example process 700 for execution of a transaction that may be performed by one or more components of the system 100 shown in FIG. 1, according to some implementations of the current subject matter. At 702, a near-field communication (NFC) exchange may be executed between a contactless card (e.g., contactless card 102) and a mobile device (e.g., mobile device 104) upon the contactless card being detected by the mobile device to be located within a predetermined distance (e.g., distance/area 114) of the mobile device. At 704, in response to the execution of the NFC exchange, one or more identifiers associated with a transaction may be received from the contactless card (e.g., contactless card information, account number, expiration date, etc., as discussed above). The transaction may be configured to be executed using at least one computing device (e.g., computing device 108) communicatively coupled to the mobile device.

At 706, one or more virtual identifiers may be generated by the mobile device 104 using one or more identifiers associated with the transaction. The virtual identifier(s) may be associated with one or more financial accounts, e.g., user's financial accounts. The accounts information (e.g., name of the account, available balance, etc., as shown in FIG. 4) may be displayed on a user interface of the mobile device. At 708, at least one virtual identifier may be selected and assigned to the transaction. At 710, execution of the transaction may be performed by the computing device using the assigned virtual identifier.

Figure 8:
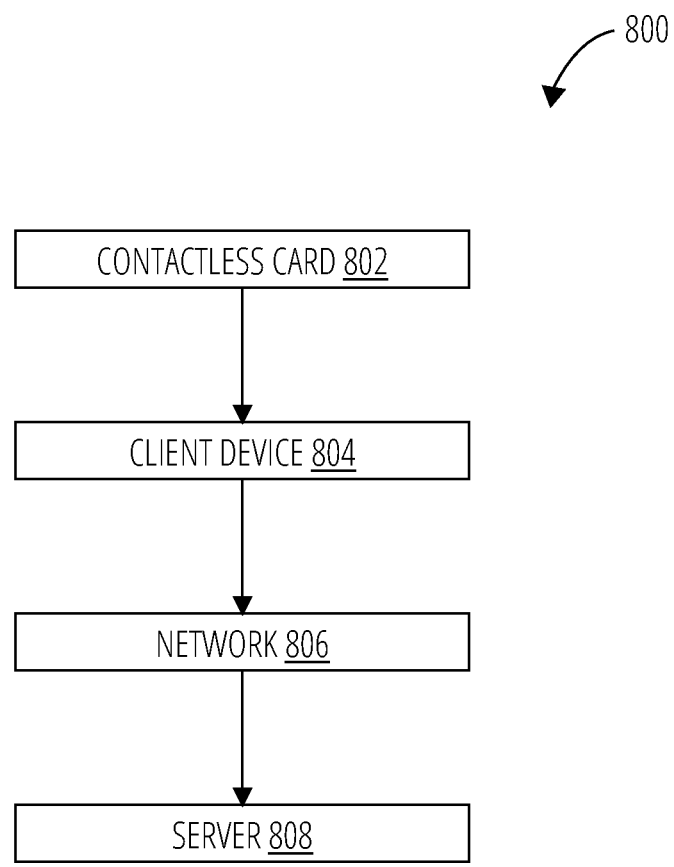
FIG. 8 illustrates an aspect of the subject matter in accordance with some implementations.

FIG. 8 illustrates a data transmission system 800 according to an example embodiment. As further discussed below, system 800 may include contactless card 802, client device 804, network 806, and server 808. Although FIG. 8 illustrates single instances of the components, system 800 may include any number of components.

System 800 may include one or more contactless cards 802, which are further explained below. In some embodiments, contactless card 802 may be in wireless communication, utilizing NFC in an example, with client device 804.

System 800 may include client device 804, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 804 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 804 of system 800 may execute one or more applications, such as software applications, that enable, for example, network communications with one or more components of system 800 and transmit and/or receive data.

The client device 804 may be in communication with one or more server(s) 808 via one or more network(s) 806, and may operate as a respective front-end to back-end pair with server 808. The client device 804 may transmit, for example from a mobile device application executing on client device 804, one or more requests to server 808. The one or more requests may be associated with retrieving data from server 808. The server 808 may receive the one or more requests from client device 804. Based on the one or more requests from client device 804, server 808 may be configured to retrieve the requested data from one or more databases (not shown). Based on receipt of the requested data from the one or more databases, server 808 may be configured to transmit the received data to client device 804, the received data being responsive to one or more requests.

System 800 may include one or more networks 806. In some examples, network 806 may be one or more of a wireless network, a wired network or any combination of wireless network and wired network, and may be configured to connect client device 804 to server 808. For example, network 806 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1502.11 family of networking, Bluetooth, NFC, Radio Frequency Identification (RFID), Wi-Fi, and/or the like.

In addition, network 806 may include, without limitation, telephone lines, fiber optics, IEEE Ethernet 802.3, a wide area network, a wireless personal area network, a LAN, or a global network such as the Internet. In addition, network 806 may support an Internet network, a wireless communication network, a cellular network, or the like, or any combination thereof. network 806 may further include one network, or any number of the exemplary types of networks mentioned above, operating as a stand-alone network or in cooperation with each other. network 806 may utilize one or more protocols of one or more network elements to which they are communicatively coupled. network 806 may translate to or from other protocols to one or more protocols of network devices. Although network 806 is depicted as a single network, it should be appreciated that according to one or more examples, network 806 may comprise a plurality of interconnected networks, such as, for example, the Internet, a service provider's network, a cable television network, corporate networks, such as credit card association networks, and home networks.

System 800 may include one or more servers 808. In some examples, server 808 may include one or more processors, which are coupled to memory. The server 808 may be configured as a central system, server or platform to control and call various data at different times to execute a plurality of workflow actions. Server 120 may be configured to connect to the one or more databases. The server 808 may be connected to at least one client device 804.

Figure 9:
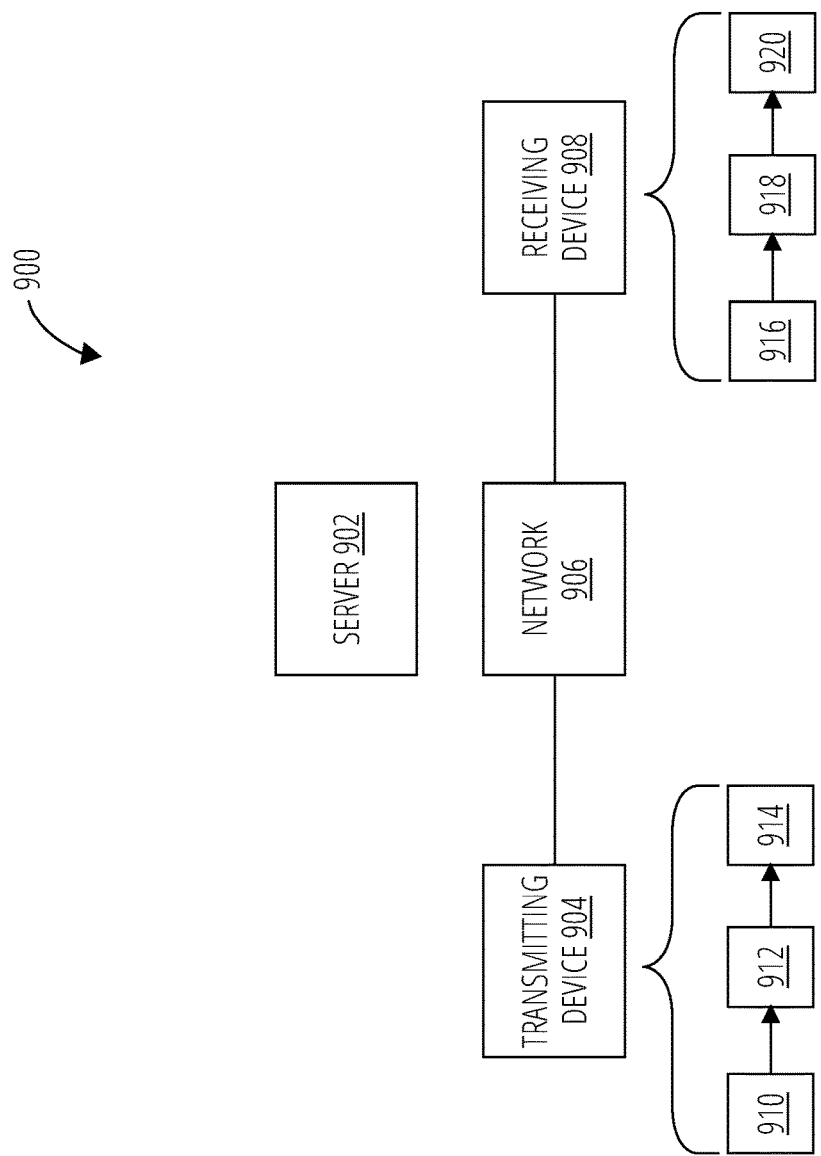
FIG. 9 illustrates an aspect of the subject matter in accordance with some implementations.

FIG. 9 illustrates a data transmission system according to an example embodiment. System 900 may include a transmitting or transmitting device 904, a receiving or receiving device 908 in communication, for example via network 906, with one or more servers 902. Transmitting or transmitting device 904 may be the same as, or similar to, mobile device 104 and/or computing device 108 discussed above with reference to FIG. 1. Receiving or receiving device 908 may be the same as, or similar to, mobile device 104 and/or computing device 108 discussed above with reference to FIG. 1. Network 906 may be similar to any network communicatively coupling components of the system 100 discussed above with reference to FIG. 1. Server 902 may be similar to any server 110, 112 discussed above with reference to FIG. 1. Although FIG. 9 shows single instances of components of system 900, system 900 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 9, system 900 may be configured to implement key diversification. For example, a sender and recipient may desire to exchange data (e.g., original sensitive data) via respective devices 904 and 908. As explained above, although single instances of transmitting device 904 and receiving device 908 may be included, it is understood that one or more transmitting devices 904 and one or more receiving devices 908 may be involved so long as each party shares the same shared secret symmetric key. In some examples, the transmitting device 904 and receiving device 908 may be provisioned with the same master symmetric key. Further, it is understood that any party or device holding the same secret symmetric key may perform the functions of the transmitting device 904 and similarly any party holding the same secret symmetric key may perform the functions of the receiving device 908. In some examples, the symmetric key may comprise the shared secret symmetric key which is kept secret from all parties other than the transmitting device 904 and the receiving device 908 involved in exchanging the secure data. It is further understood that both the transmitting device 904 and receiving device 908 may be provided with the same master symmetric key, and further that part of the data exchanged between the transmitting device 904 and receiving device 908 comprises at least a portion of data which may be referred to as the counter value. The counter value may comprise a number that changes each time data is exchanged between the transmitting device 904 and the receiving device 908.

System 900 may include one or more networks 906. In some examples, network 906 may be one or more of a wireless network, a wired network or any combination of wireless network and wired network, and may be configured to connect one or more transmitting devices 904 and one or more receiving devices 908 to server 902. For example, network 906 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1502.11 family network, Bluetooth, NFC, RFID, Wi-Fi, and/or the like.

In addition, network 906 may include, without limitation, telephone lines, fiber optics, IEEE Ethernet 1602.3, a wide area network, a wireless personal area network, a LAN, or a global network such as the Internet. In addition, network 906 may support an Internet network, a wireless communication network, a cellular network, or the like, or any combination thereof. Network 906 may further include one network, or any number of the exemplary types of networks mentioned above, operating as a stand-alone network or in cooperation with each other. Network 906 may utilize one or more protocols of one or more network elements to which they are communicatively coupled. Network 906 may translate to or from other protocols to one or more protocols of network devices. Although network 906 is depicted as a single network, it should be appreciated that according to one or more examples, network 906 may comprise a plurality of interconnected networks, such as, for example, the Internet, a service provider's network, a cable television network, corporate networks, such as credit card association networks, and home networks.

In some examples, one or more transmitting devices 904 and one or more receiving devices 908 may be configured to communicate and transmit and receive data between each other without passing through network 906. For example, communication between the one or more transmitting devices 904 and the one or more receiving devices 908 may occur via at least one of NFC, Bluetooth, RFID, Wi-Fi, and/or the like.

At 910, when the transmitting device 904 is preparing to process the sensitive data with symmetric cryptographic operation, the sender may update a counter. In addition, the transmitting device 904 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At 912, the transmitting device 904 may take the selected cryptographic algorithm, and using the master symmetric key, process the counter value. For example, the sender may select a symmetric encryption algorithm, and use a counter which updates with every conversation between the transmitting device 904 and the receiving device 908. The transmitting device 904 may then encrypt the counter value with the selected symmetric encryption algorithm using the master symmetric key, creating a diversified symmetric key.

In some examples, the counter value may not be encrypted. In these examples, the counter value may be transmitted between the transmitting device 904 and the receiving device 908 at 912 without encryption.

At 914, the diversified symmetric key may be used to process the sensitive data before transmitting the result to the receiving device 908. For example, the transmitting device 904 may encrypt the sensitive data using a symmetric encryption algorithm using the diversified symmetric key, with the output comprising the protected encrypted data. The transmitting device 904 may then transmit the protected encrypted data, along with the counter value, to the receiving device 908 for processing.

At 916, the receiving device 908 may first take the counter value and then perform the same symmetric encryption using the counter value as input to the encryption, and the master symmetric key as the key for the encryption. The output of the encryption may be the same diversified symmetric key value that was created by the sender.

At 918, the receiving device 908 may then take the protected encrypted data and using a symmetric decryption algorithm along with the diversified symmetric key, decrypt the protected encrypted data.

At 920, as a result of the decrypting the protected encrypted data, the original sensitive data may be revealed.

The next time sensitive data needs to be sent from the sender to the recipient via respective transmitting device 904 and receiving device 908, a different counter value may be selected producing a different diversified symmetric key. By processing the counter value with the master symmetric key and same symmetric cryptographic algorithm, both the transmitting device 904 and receiving device 908 may independently produce the same diversified symmetric key. This diversified symmetric key, not the master symmetric key, is used to protect the sensitive data.

As explained above, both the transmitting device 904 and receiving device 908 each initially possess the shared master symmetric key. The shared master symmetric key is not used to encrypt the original sensitive data. Because the diversified symmetric key is independently created by both the transmitting device 904 and receiving device 908, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 904 and the receiving device 908 may be governed by symmetric requirements for how often to create a new diversification value, and therefore a new diversified symmetric key. In an embodiment, a new diversification value and therefore a new diversified symmetric key may be created for every exchange between the transmitting device 904 and receiving device 908.

In some examples, the key diversification value may comprise the counter value. Other non-limiting examples of the key diversification value include: a random nonce generated each time a new diversified key is needed, the random nonce sent from the transmitting device 904 to the receiving device 908; the full value of a counter value sent from the transmitting device 904 and the receiving device 908; a portion of a counter value sent from the transmitting device 904 and the receiving device 908; a counter independently maintained by the transmitting device 904 and the receiving device 908 but not sent between the two devices; a one-time-passcode exchanged between the transmitting device 904 and the receiving device 908; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 904 and the receiving device 908. In effect, this may create a one-time use key, such as a single-use session key.

Figure 10:
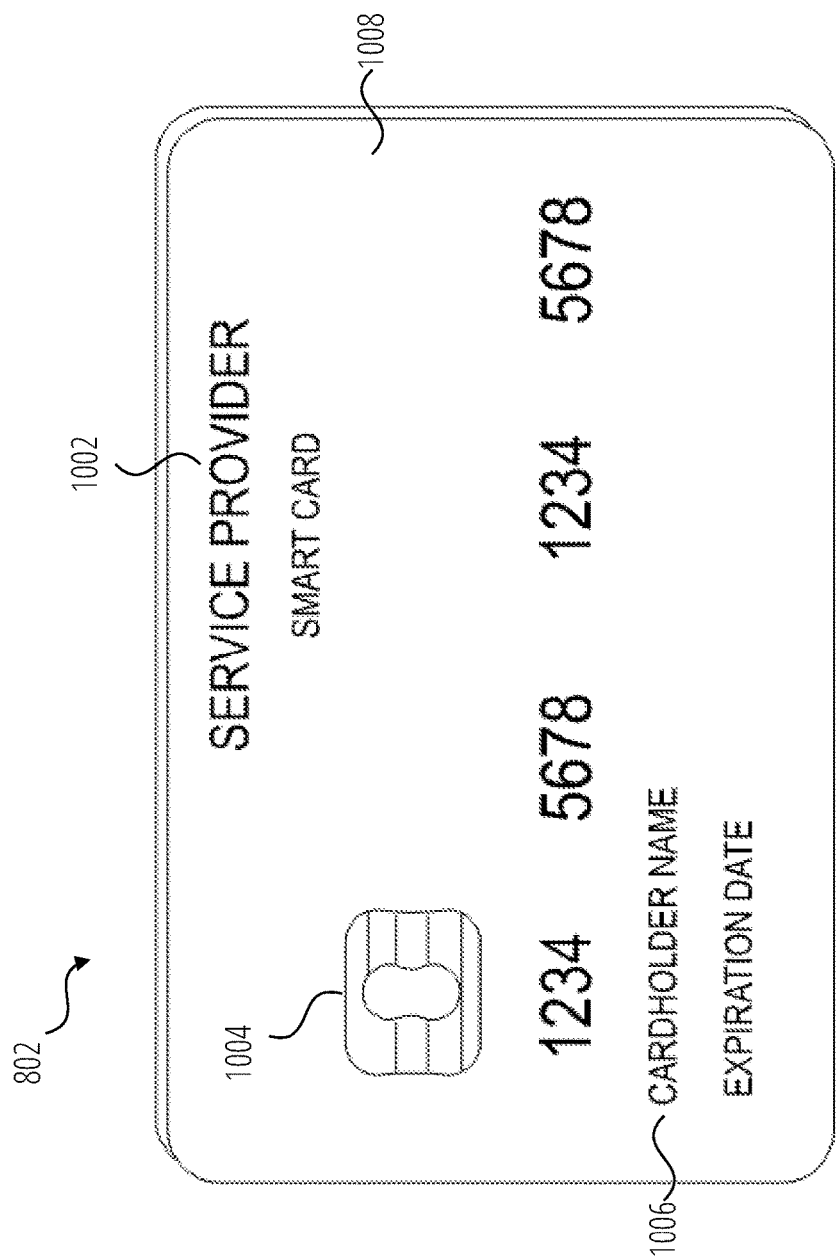
FIG. 10 illustrates a contactless card, according to some implementations of the current subject matter.

FIG. 10 illustrates an example configuration of a contactless card 802, which may include a contactless card, a payment card, such as a credit card, debit card, or gift card, issued by a service provider as displayed as service provider indicia 1002 on the front or back of the contactless card 802. In some examples, the contactless card 802 is not related to a payment card, and may include, without limitation, an identification card. In some examples, the transaction card may include a dual interface contactless payment card, a rewards card, and so forth. The contactless card 802 may include a substrate 1008, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 802 may have physical characteristics compliant with the ID-1 format of the ISO/IEC 7816 standard, and the transaction card may otherwise be compliant with the ISO/IEC 14443 standard. However, it is understood that the contactless card 802 according to the present disclosure may have different characteristics, and the present disclosure does not require a transaction card to be implemented in a payment card.

Figure 11:
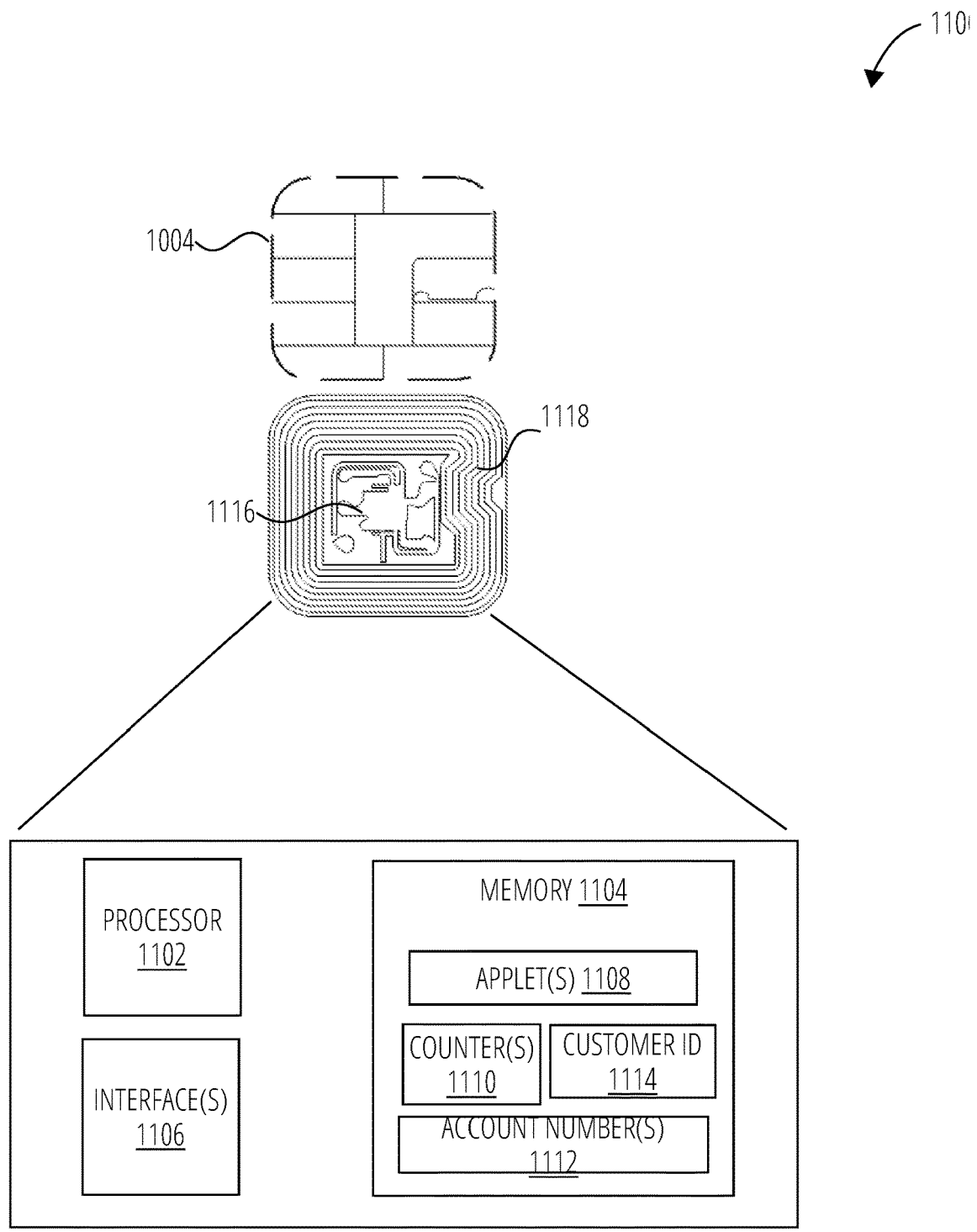
FIG. 11 illustrates a transaction card component, according to some implementations of the current subject matter.

The contactless card 802 may also include identification information 1006 displayed on the front and/or back of the card, and a contact pad 1004. The contact pad 1004 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 802 may also include processing circuitry, antenna and other components as will be further discussed in FIG. 11. These components may be located behind the contact pad 1004 or elsewhere on the substrate 1008, e.g., within a different layer of the substrate 1008, and may electrically and physically coupled with the contact pad 1004. The contactless card 802 may also include a magnetic strip or tape, which may be located on the back of the card (not shown in FIG. 10). The contactless card 802 may also include a Near-Field Communication (NFC) device coupled with an antenna capable of communicating via the NFC protocol. Embodiments are not limited in this manner.

As illustrated in FIG. 2, the contact pad 1004 of contactless card 802 may include processing circuitry 1116 for storing, processing, and communicating information, including a processor 1102, a memory 1104, and one or more interface(s) 1106. It is understood that the processing circuitry 1116 may contain additional components, including processors, memories, error and parity/CRC checkers, data encoders, anticollision algorithms, controllers, command decoders, security primitives and tamperproofing hardware, as necessary to perform the functions described herein.

The memory 1104 may be a read-only memory, write-once read-multiple memory or read/write memory, e.g., RAM, ROM, and EEPROM, and the contactless card 802 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 1104 may be encrypted memory utilizing an encryption algorithm executed by the processor 1102 to encrypted data.

The memory 1104 may be configured to store one or more applet(s) 1108, one or more counter(s) 1110, a customer identifier 1114, and the account number(s) 1112, which may be virtual account numbers. The one or more applet(s) 1108 may comprise one or more software applications configured to execute on one or more contactless cards, such as a Java® Card applet. However, it is understood that applet(s) 1108 are not limited to Java Card applets, and instead may be any software application operable on contactless cards or other devices having limited memory. The one or more counter(s) 1110 may comprise a numeric counter sufficient to store an integer. The customer identifier 1114 may comprise a unique alphanumeric identifier assigned to a user of the contactless card 802, and the identifier may distinguish the user of the contactless card from other contactless card users. In some examples, the customer identifier 1114 may identify both a customer and an account assigned to that customer and may further identify the contactless card 802 associated with the customer's account. As stated, the account number(s) 1112 may include thousands of one-time use virtual account numbers associated with the contactless card 802. An applet (s) 1108 of the contactless card 802 may be configured to manage the account number(s) 1112 (e.g., to select an account number(s) 1112, mark the selected account number (s) 1112 as used, and transmit the account number(s) 1112 to a mobile device for autofilling by an autofilling service.

The processor 1102 and memory elements of the foregoing exemplary embodiments are described with reference to the contact pad 1004, but the present disclosure is not limited thereto. It is understood that these elements may be implemented outside of the contact pad 1004 or entirely separate from it, or as further elements in addition to processor 1102 and memory 1104 elements located within the contact pad 1004.

In some examples, the contactless card 802 may comprise one or more antenna(s) 1118. The one or more antenna(s) 1118 may be placed within the contactless card 802 and around the processing circuitry 1116 of the contact pad 1004. For example, the one or more antenna(s) 1118 may be integral with the processing circuitry 1116 and the one or more antenna(s) 1118 may be used with an external booster coil. As another example, the one or more antenna(s) 1118 may be external to the contact pad 1004 and the processing circuitry 1116.

In an embodiment, the coil of contactless card 802 may act as the secondary of an air core transformer. The terminal may communicate with the contactless card 802 by cutting power or amplitude modulation. The contactless card 802 may infer the data transmitted from the terminal using the gaps in the contactless card's power connection, which may be functionally maintained through one or more capacitors. The contactless card 802 may communicate back by switching a load on the contactless card's coil or load modulation.

Load modulation may be detected in the terminal's coil through interference. More generally, using the antenna(s) 1118, processor 1102, and/or the memory 1104, the contactless card 802 provides a communications interface to communicate via NFC, Bluetooth, and/or Wi-Fi communications.

As explained above, contactless card 802 may be built on a software platform operable on smart cards or other devices having limited memory, such as JavaCard, and one or more or more applications or applets may be securely executed. Applet(s) 1108 may be added to contactless cards to provide a one-time password (OTP) for multifactor authentication (MFA) in various mobile application-based use cases. Applet(s) 1108 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 1108 may be configured to encode the OTP as an NDEF type 4 well known type text tag. In some examples, NDEF messages may comprise one or more records. The applet(s) 1108 may be configured to add one or more static tag records in addition to the OTP record.

In some examples, the one or more applet(s) 1108 may be configured to emulate an RFID tag. The RFID tag may include one or more polymorphic tags. In some examples, each time the tag is read, different cryptographic data is presented that may indicate the authenticity of the contactless card. Based on the one or more applet(s) 1108, an NFC read of the tag may be processed, the data may be transmitted to a server, such as a server of a banking system, and the data may be validated at the server.

In some examples, the contactless card 802 and server may include certain data such that the card may be properly identified. The contactless card 802 may include one or more unique identifiers (not pictured). Each time a read operation takes place, the counter(s) 1110 may be configured to increment. In some examples, each time data from the contactless card 802 is read (e.g., by a mobile device), the counter(s) 1110 is transmitted to the server for validation and determines whether the counter(s) 1110 are equal (as part of the validation) to a counter of the server.

The one or more counter(s) 1110 may be configured to prevent a replay attack. For example, if a cryptogram has been obtained and replayed, that cryptogram is immediately rejected if the counter(s) 1110 has been read or used or otherwise passed over. If the counter(s) 1110 has not been used, it may be replayed. In some examples, the counter that is incremented on the card is different from the counter that is incremented for transactions. The contactless card 101 is unable to determine the application transaction counter(s) 1110 since there is no communication between applet(s) 1108 on the contactless card 802.

In some examples, the counter(s) 1110 may get out of sync. In some examples, to account for accidental reads that initiate transactions, such as reading at an angle, the counter(s) 1110 may increment but the application does not process the counter(s) 1110. In some examples, when the mobile device 104 is woken up, NFC may be enabled and the mobile device 104 may be configured to read available tags, but no action is taken responsive to the reads.

To keep the counter(s) 1110 in sync, an application, such as a background application, may be executed that would be configured to detect when the mobile device 104 wakes up and synchronize with the server of a banking system indicating that a read that occurred due to detection to then move the counter 1100 forward. In other examples, Hashed One Time Password may be utilized such that a window of mis-synchronization may be accepted. For example, if within a threshold of 10, the counter(s) 1110 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 1110 increases in the appropriate sequence, then it possible to know that the user has done so.

The key diversification technique described herein with reference to the counter(s) 1110, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 802, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 802. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 802 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 12:
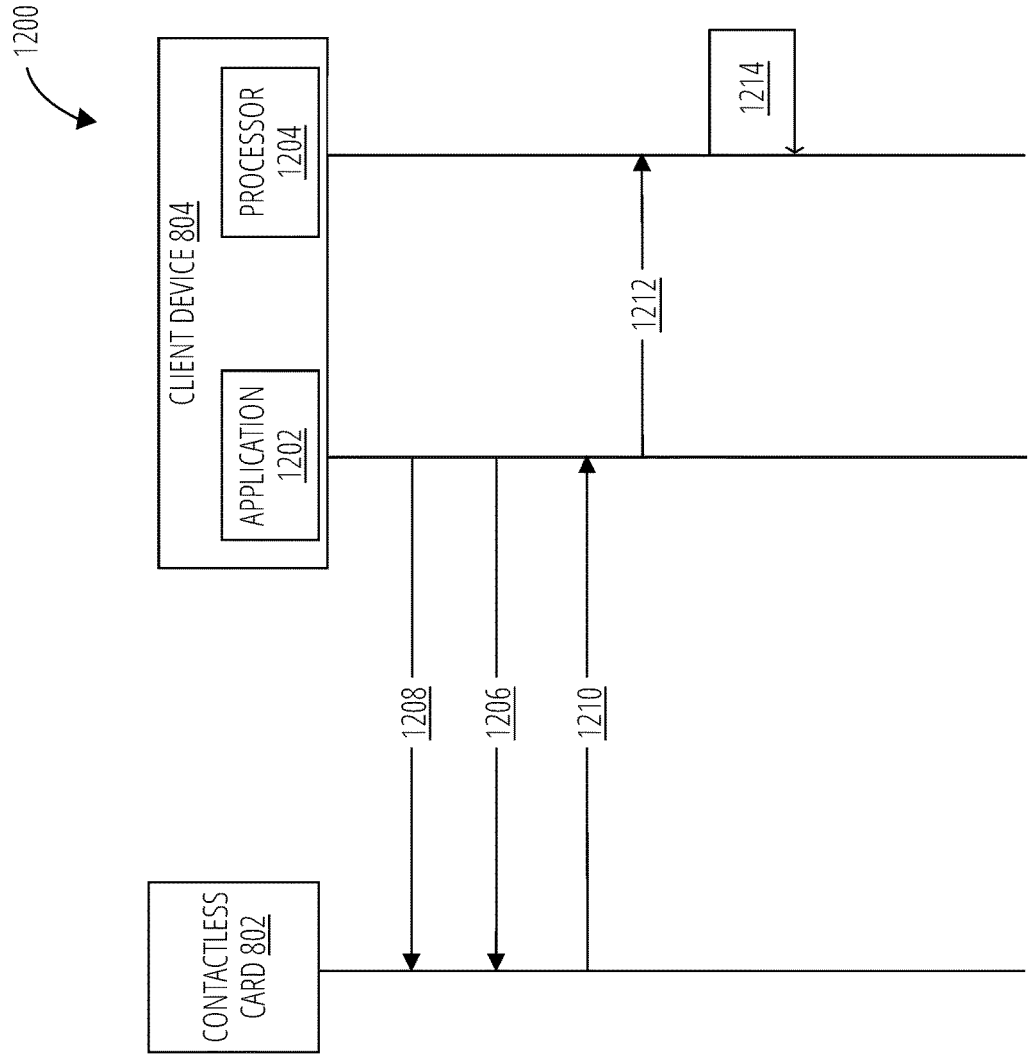
FIG. 12 illustrates a sequence flow, according to some implementations of the current subject matter.

FIG. 12 is a timing diagram illustrating an example sequence for providing authenticated access according to one or more embodiments of the present disclosure. Sequence flow 1200 may include contactless card 802 and client device 804, which may include an application 1202 and processor 1204.

At line 1208, the application 1202 communicates with the contactless card 802 (e.g., after being brought near the contactless card 802). Communication between the application 1202 and the contactless card 802 may involve the contactless card 802 being sufficiently close to a card reader (not shown) of the client device 804 to enable NFC data transfer between the application 1202 and the contactless card 802.

At line 1206, after communication has been established between client device 804 and contactless card 802, contactless card 802 generates a message authentication code (MAC) cryptogram. In some examples, this may occur when the contactless card 802 is read by the application 1202. In particular, this may occur upon a read, such as an NFC read, of a near field data exchange (NDEF) tag, which may be created in accordance with the NFC Data Exchange Format. For example, a reader application, such as application 1202, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 802 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 1202 may be configured to transmit a request to contactless card 802, the request comprising an instruction to generate a MAC cryptogram.

At line 1210, the contactless card 802 sends the MAC cryptogram to the application 1202. In some examples, the transmission of the MAC cryptogram occurs via NFC, however, the present disclosure is not limited thereto. In other examples, this communication may occur via Bluetooth, Wi-Fi, or other means of wireless data communication. At line 1212, the application 1202 communicates the MAC cryptogram to the processor 1204.

At line 1214, the processor 1204 verifies the MAC cryptogram pursuant to an instruction from the application 122. For example, the MAC cryptogram may be verified, as explained below. In some examples, verifying the MAC cryptogram may be performed by a device other than client device 804, such as a server of a banking system in data communication with the client device 804. For example, processor 1204 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 13:
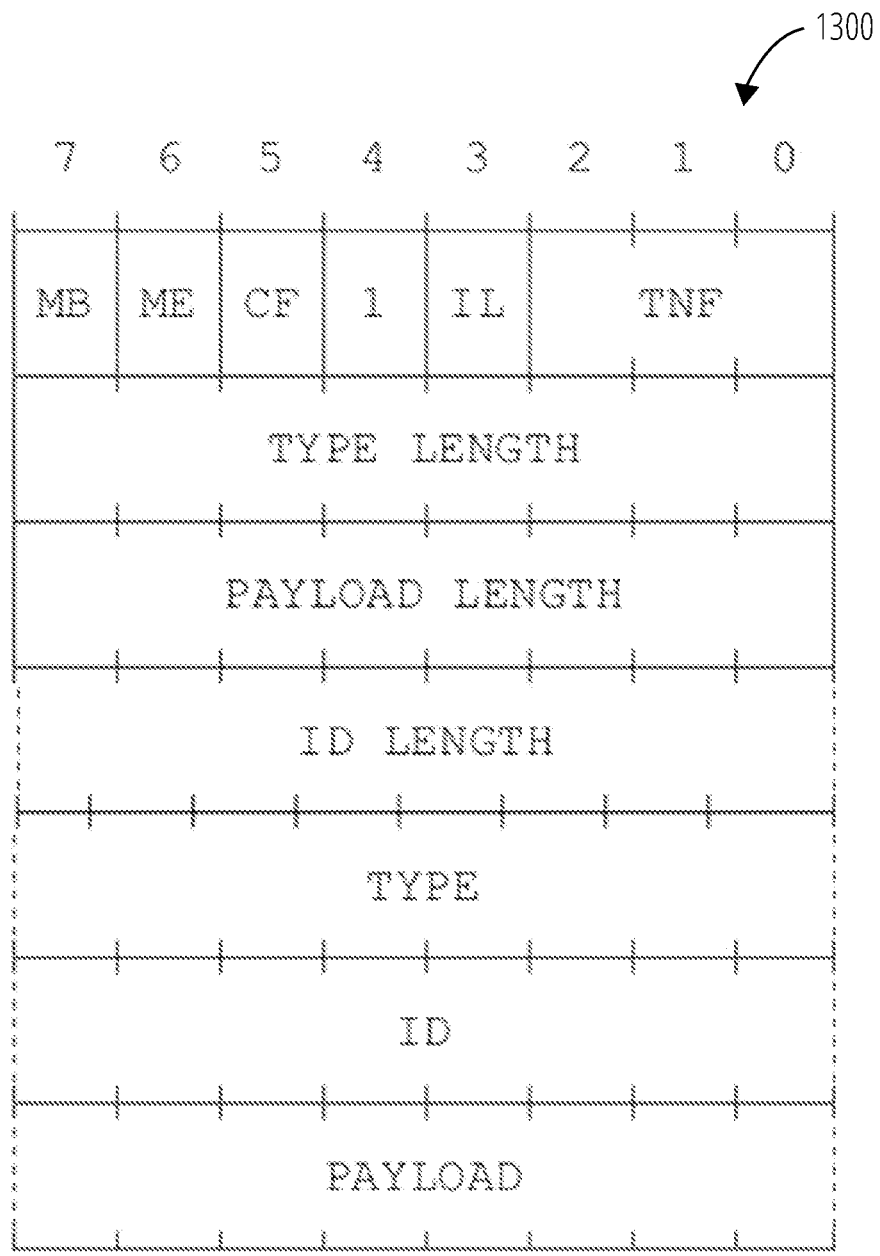
FIG. 13 illustrates a data structure, according to some implementations of the current subject matter.

FIG. 13 illustrates an NDEF short-record layout (SR=1) data structure 1300 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 14:
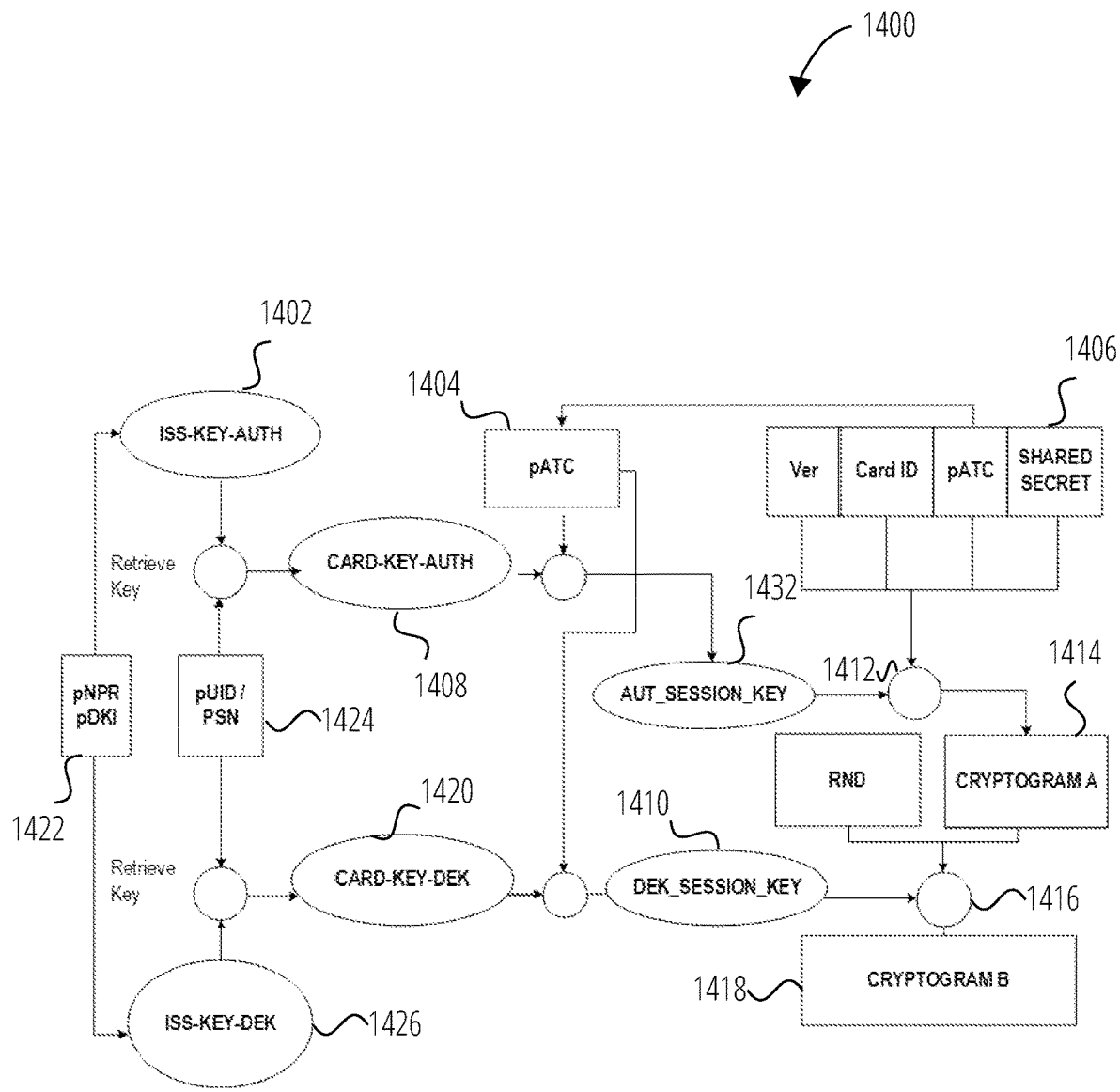
FIG. 14 is a diagram of a key system, according to some implementations of the current subject matter.

FIG. 14 illustrates a diagram of a system 1400 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1402, 1426 may be required for each part of the portfolio on which the one or more applets is issued. For example, the first master key 1402 may comprise an Issuer Cryptogram Generation/Authentication Key (Iss-Key-Auth) and the second master key 1426 may comprise an Issuer Data Encryption Key (Iss-Key-DEK). As further explained herein, two issuer master keys 1402, 1426 are diversified into card master keys 1408, 1420, which are unique for each card. In some examples, a network profile record ID (pNPR) 522 and derivation key index (pDKI) 1424, as back office data, may be used to identify which Issuer Master Keys 1402, 1426 to use in the cryptographic processes for authentication. The system performing the authentication may be configured to retrieve values of pNPR 1422 and pDKI 1424 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1408 and Card-Key-Dek 1420). The session keys (Aut-Session-Key 1432 and DEK-Session-Key 1410) may be generated by the one or more applets and derived by using the application transaction counter (pATC) 1404 with one or more algorithms. To fit data into the one or more algorithms, only the 2 low order bytes of the 4-byte pATC 1404 is used. In some examples, the four byte session key derivation method may comprise: F1:=PATC(lower 2 bytes) ||'F0'||'00'||PATC(four bytes) F1:=PATC(lower 2 bytes) ||'0F'||'00'||PATC(four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 1404 counter. At each tap of the contactless card, pATC 1404 is configured to be updated, and the card master keys Card-Key-AUTH 508 and Card-Key-DEK 1420 are further diversified into the session keys Aut-Session-KEY 1432 and DEK-Session-KEY 1410. pATC 1404 may be initialized to zero at personalization or applet initialization time. In some examples, the pATC counter 1404 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that size may be used, or the output may be automatically, or manually, padded to a multiple of that size.

The MAC may be performed by a function key (AUT-Session-Key) 1432. The data specified in cryptogram be may be processed with javacard.signature method: ALG_DES_MAC8_ISO9797_1_M2_ALG3 to correlate to EMV ARQC verification methods. The key used for this computation may comprise a session key AUT-Session-Key 1432, as explained above. As explained above, the low order two bytes of the counter may be used to diversify for the one or more MAC session keys. As explained below, AUT-Session-Key 1432 may be used to MAC data 1406, and the resulting data or cryptogram A 1414 and random number RND may be encrypted using DEK-Session-Key 1410 to create cryptogram B or output 1418 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1410 derived from the Card-Key-DEK 1420. In this case, the ATC value for the session key derivation is the least significant byte of the counter pATC 1404.

The format below represents a binary version example embodiment. Further, in some examples, the first byte may be set to ASCII 'A'.

| Message Format | | | | | |
|---|---|---|---|---|---|
| 1 | 2 | 4 | 8 | 8 | |
| 0x43 (Message Type 'A') | Version | pATC | RND | Cryptogram A (MAC) | |
| Cryptogram A | 8 bytes | | | | |

-continued

| (MAC) | | | | |
|---|---|---|---|---|
| MAC of | | | | |
| 2 | 8 | 4 | 4 | 18 bytes input data |
| Version | pUID | pATC | Shared Secret | |

| Message Format | | | |
|---|---|---|---|
| 1 | 2 | 4 | 16 |
| 0x43 (Message Type 'A') | Version | pATC | Cryptogram B |
| Cryptogram A | 8 bytes | | |
| (MAC) | | | |
| MAC of | | | |
| 2 | 8 | 4 | 4 | 18 bytes input data |
| Version | pUID | pATC | Shared Secret | |

| Cryptogram B | 16 |
|---|---|
| Sym Encryption of | |
| 8 | 8 |
| RND | Cryptogram A |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version | pUID | pATC | Cryptogram |
| 8 bytes | | | |
| 8 | | 4 | 4 | 18 bytes input data |
| pUID | pUID | pATC | Shared Secret | |
| Cryptogram B | 16 | | |
| Sym Encryption of | | | |
| 8 | 8 | | |
| RND | Cryptogram A | | |

The UID field of the received message may be extracted to derive, from master keys Iss-Key-AUTH 502 and Iss-Key-DEK 1426, the card master keys (Card-Key-Auth 1408 and Card-Key-DEK 1420) for that particular card. Using the card master keys (Card-Key-Auth 508 and Card-Key-DEK 1420), the counter (pATC) field of the received message may be used to derive the session keys (Aut-Session-Key 1432 and DEK-Session-Key 1410) for that particular card. Cryptogram B 1418 may be decrypted using the DEK-Session-KEY, which yields cryptogram A 1414 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1414, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1432. The input data 1406 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1412, data 1406 is processed through the MAC using Aut-Session-Key 1432 to produce MAC output (cryptogram A) 1414, which is encrypted.

In order to provide additional protection against brute force attacks exposing the keys on the card, it is desirable that the MAC cryptogram 1414 be enciphered. In some examples, data or cryptogram A 1414 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1410. In the encryption operation 1416, data or cryptogram A 1414 and RND are processed using DEK-Session-Key 510 to produce encrypted data, cryptogram B 1418. The data 1414 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 15:
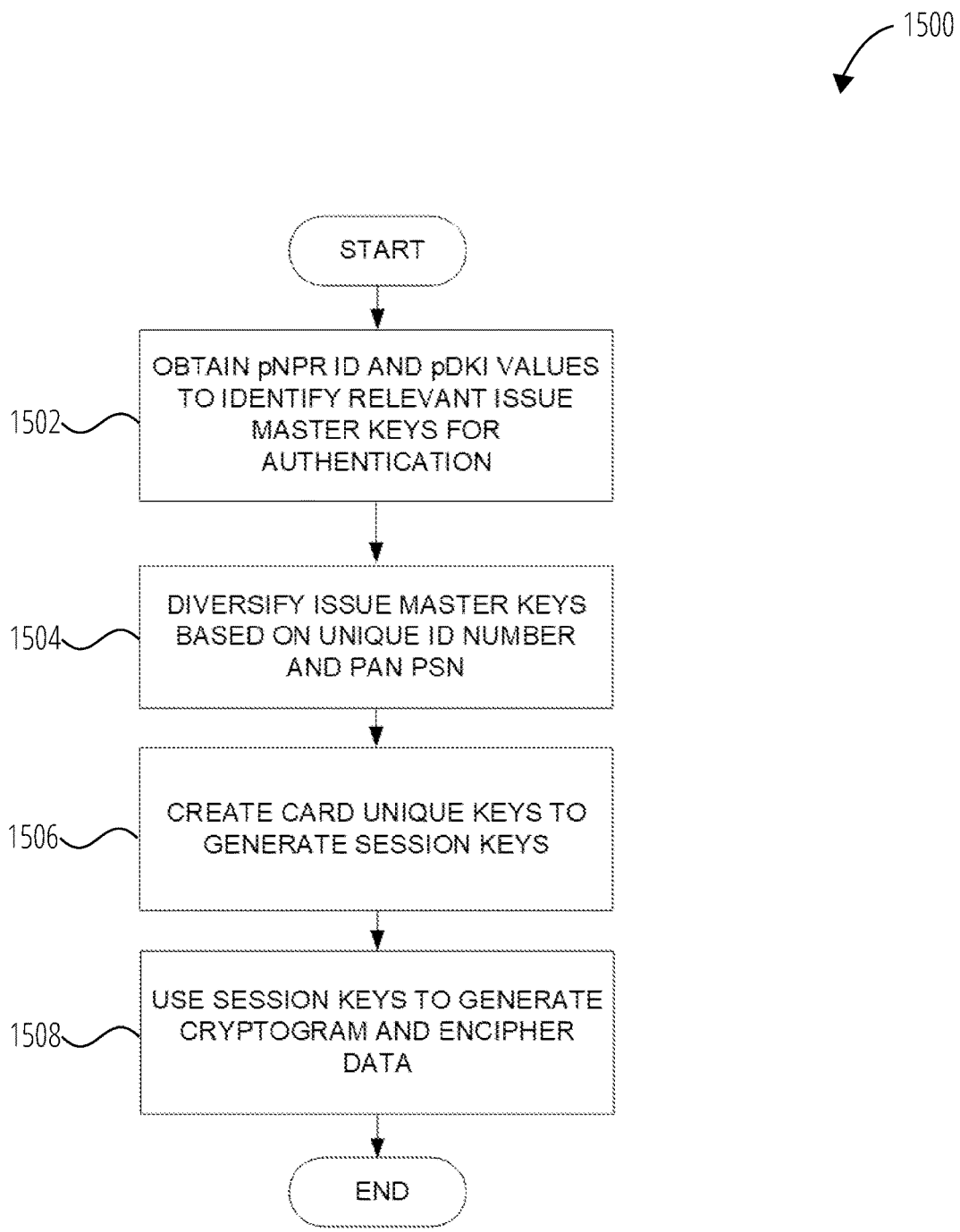
FIG. 15 is a flowchart of a method of generating a cryptogram, according to some implementations of the current subject matter.

FIG. 15 illustrates a method 1500 for generating a cryptogram. For example, At 1502, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At 1504, Issuer Master Keys may be diversified by combining them with the card's unique ID number (pUID) and the PAN sequence number (PSN) of one or more applets, for example, a payment applet.

At 1506, Card-Key-Auth and Card-Key-DEK (unique card keys) may be created by diversifying the Issuer Master Keys to generate session keys which may be used to generate a MAC cryptogram.

At 1508, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 16:
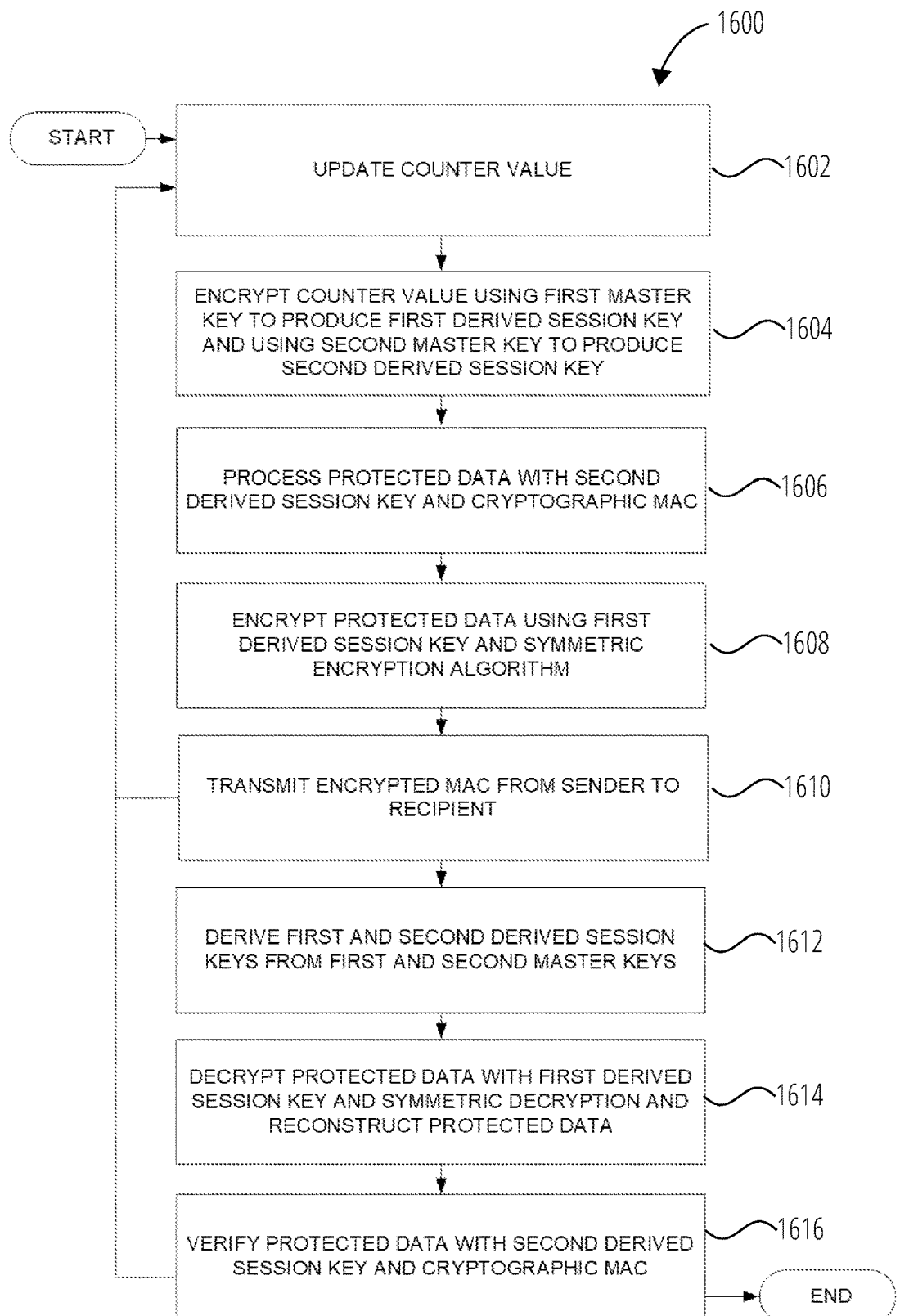
FIG. 16 illustrates an aspect of the subject matter in accordance with some implementations.

FIG. 16 depicts an exemplary process 1600 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at 1602, and other data, such as data to be protected, which it may secure share with the recipient.

At 1604, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At 1606, the data to be protected is processed with a cryptographic MAC operation by the sender using the data integrity session key and a cryptographic MAC algorithm.

The protected data, including plaintext and shared secret, may be used to produce a MAC using one of the session keys (AUT-Session-Key).

At 1608, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At 1610, the encrypted MAC is transmitted, from the sender to the recipient, with sufficient information to identify additional secret information (such as shared secret, master keys, etc.), for verification of the cryptogram.

At 1612, the recipient uses the received counter value to independently derive the two derived session keys from the two master keys as explained above.

At 1614, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At 1616, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1602) and a new set of session keys may be created (at 1610). In some examples, the combined random data may be discarded.

Figure 17:
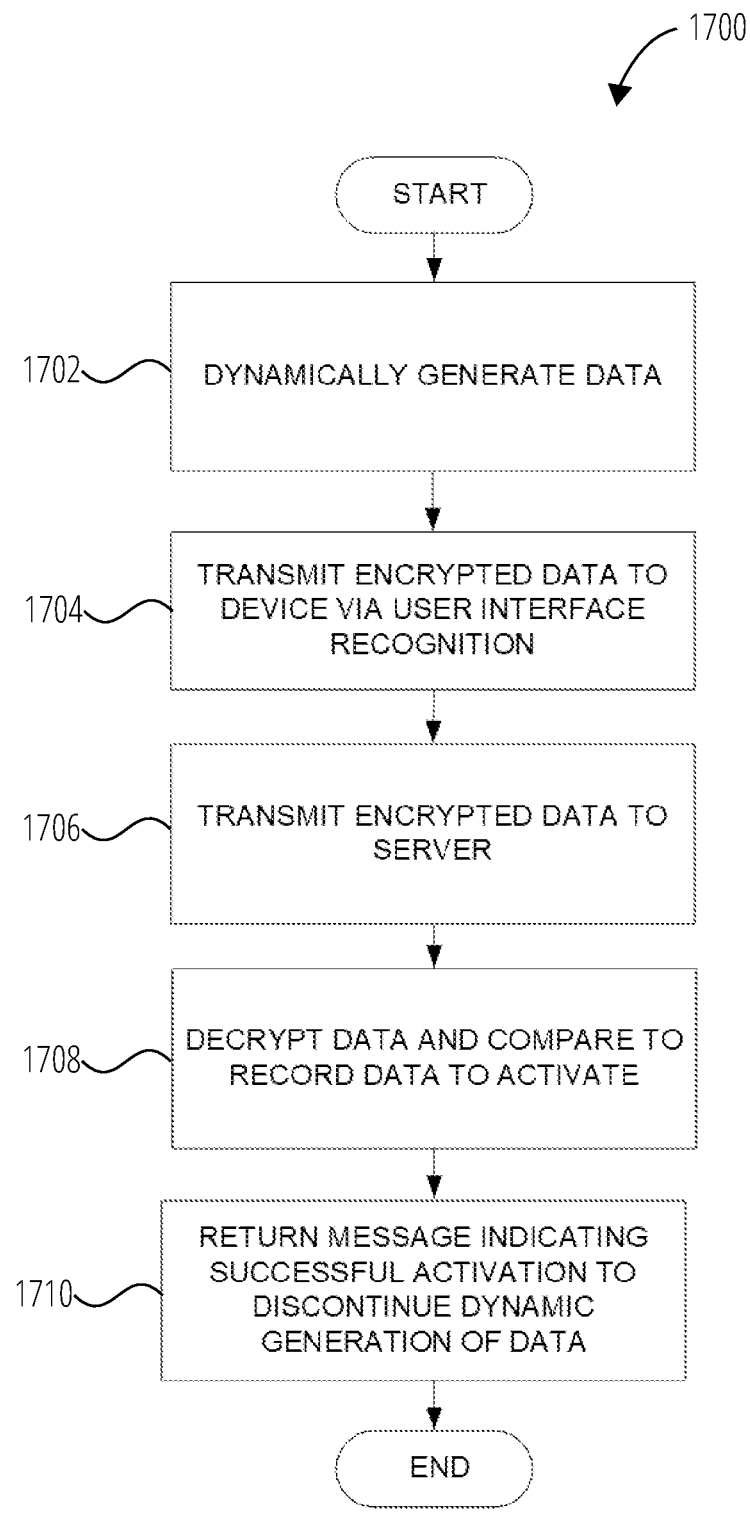
FIG. 17 illustrates an aspect of the subject matter in accordance with some implementations.

FIG. 17 illustrates a method 1700 for card activation according to an example embodiment. For example, card activation may be completed by a system including a card, a device, and one or more servers. The contactless card, device, and one or more servers may reference same or similar components that were previously explained above, such as contactless card 802, client device 804, and a server.

At 1702, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

At 1704, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

At 1706, the one or more portions of the data may be communicated to one or more servers, such as a card issuer server. For example, one or more encrypted portions of the data may be transmitted from the device to the card issuer server for activation of the card.

At 1708, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

At 1710, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

The various elements of the devices as previously described with reference to FIGS. 1-17 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or rewritable media, digital or analog media, hard disk, floppy disk, Compact Disk Read Only Memory (CD-ROM), Compact Disk Recordable (CD-R), Compact Disk Rewritable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed:

1. A computer implemented method, comprising:
receiving, using at least one processor, an identifier associated with a transaction, the transaction is configured to be executed using at least one computing device communicatively coupled to the at least one processor;
generating, using the at least one processor, using the received identifier, one or more virtual identifiers;
selecting, using the at least one processor, at least one virtual identifier in the one or more virtual identifiers, the selected at least one virtual identifier being associated with a financial account selected from one or more financial accounts, and assigning the selected at least one virtual identifier to the transaction; and
triggering, using the at least one processor, execution of the transaction by the at least one computing device using the assigned at least one virtual identifier.

2. The method according to claim 1, wherein the receiving includes receiving, using the at least one processor, the identifier from a contactless card communicatively coupled to the at least one processor, the contactless card storing the identifier.

3. The method according to claim 2, wherein the receiving includes executing a near-field communication (NFC) exchange between the contactless card and the at least one processor upon the contactless card being detected by the at least one processor to be located within a predetermined distance of the at least one processor.

4. The method according to claim 3, wherein the executing the NFC exchange includes triggering the at least one processor to generate at least one user interface, the at least one user interface receiving an input triggering the selecting.

5. The method according to claim 4, wherein the received identifier includes a contactless card number.

6. The method according to claim 5, wherein the contactless card number is associated with the one or more financial accounts, wherein the generated at least one user interface is configured to display each financial account in the one or more financial accounts in response to the executing of the NFC exchange.

7. The method according to claim 6, wherein the generated one or more virtual identifiers corresponding to the one or more financial accounts.

8. The method according to claim 2, wherein the contactless card includes at least one of the following: a credit card, a debit card, an electronic gift card, a pre-paid credit card, a pre-paid debit card, and any combination thereof.

9. A system, comprising:
a mobile device including at least one processor; and
at least one non-transitory storage media storing instructions, that when executed by the at least one processor, cause the at least one processor to generate one or more virtual identifiers using one or more identifiers associated with a transaction, the transaction is configured to be executed using at least one computing device communicatively coupled to the mobile device, wherein the one or more identifiers are received from a contactless card communicatively coupled to the mobile device, wherein at least one virtual identifier is selected from the one or more virtual identifiers, the selected at least one virtual identifier being associated with a financial account selected from one or more financial accounts, and assigned to the transaction; and
trigger execution of the transaction by the at least one computing device using at least one virtual identifier in the one or more virtual identifiers.

10. The system according to claim 9, wherein the contactless card is configured to store the one or more identifiers.

11. The system according to claim 9, wherein a near-field communication (NFC) exchange is configured to be executed between the contactless card and the mobile device upon the contactless card being detected by the mobile device to be located within a predetermined distance of the mobile device.

12. The system according to claim 11, wherein execution of the NFC exchange triggers the mobile device to generate at least one user interface, the at least one user interface is configured to receive an input triggering selection of the at least one virtual identifier from the one or more virtual identifiers.

13. The system according to claim 12, wherein the one or more identifiers include a contactless card number.

14. The system according to claim 13, wherein the contactless card number is associated with the one or more financial accounts, wherein the at least one user interface is configured to display each financial account in the one or more financial accounts in response to execution of the NFC exchange.

15. The system according to claim 14, wherein the one or more virtual identifiers correspond to the one or more financial accounts.

16. The system according to claim 9, wherein the contactless card includes at least one of the following: a credit card, a debit card, an electronic gift card, a pre-paid credit card, a pre-paid debit card, and any combination thereof.

17. A computer program product comprising a non-transitory machine-readable medium storing instructions that, when executed by at least one programmable processor, cause the at least one programmable processor to:
execute a near-field communication (NFC) exchange between a contactless card and a mobile device upon the contactless card being detected by the mobile device to be located within a predetermined distance of the mobile device;
receive, in response to the executing of the NFC exchange, from the contactless card, one or more identifiers associated with a transaction, the transaction is configured to be executed using at least one computing device communicatively coupled to the mobile device;
generate one or more virtual identifiers using the one or more identifiers associated with the transaction, the one or more virtual identifier being associated with one or more financial accounts, and displaying the one or more financial accounts on a user interface of the mobile device;
select at least one virtual identifier in the one or more virtual identifiers, the selected at least one virtual identifier being associated with a financial account selected from the one or more financial accounts, and assign the selected at least one virtual identifier to the transaction; and
trigger execution of the transaction by the at least one computing device using the assigned at least one virtual identifier.

18. The computer program product according to claim 17, wherein the one or more identifiers include a contactless card number.

19. The computer program product according to claim 17, wherein the contactless card includes at least one of the following: a credit card, a debit card, an electronic gift card, a pre-paid credit card, a pre-paid debit card, and any combination thereof.

\* \* \* \* \*